(12) United States Patent
Weber et al.

(10) Patent No.: US 10,299,350 B2
(45) Date of Patent: May 21, 2019

(54) DEVICES, SYSTEMS, AND METHODS FOR CONTROLLING ELECTRICAL LOADS

(71) Applicant: Hubbell Incorporated, Shelton, CT (US)

(72) Inventors: Theodore Eric Weber, Round Rock, TX (US); Mark Alan Rosenau, West Lake Hills, TX (US); Edward John Krohne, Liberty Hill, TX (US); Stephan Karl Zitz, Round Rock, TX (US); Thomas James Hartnagel, Round Rock, TX (US); Edward Leo Rivas, Austin, TX (US); Michael Lee Muecke, Round Rock, TX (US); Peter Anthony Baselici, Austin, TX (US); Terrence Robert Arbouw, Georgetown, TX (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 15/995,732

(22) Filed: Jun. 1, 2018

(65) Prior Publication Data

US 2018/0310385 A1    Oct. 25, 2018

Related U.S. Application Data

(63) Continuation of application No. 15/142,900, filed on Apr. 29, 2016, now Pat. No. 10,009,979.
(Continued)

(51) Int. Cl.
*H05B 37/00* (2006.01)
*H05B 37/02* (2006.01)
*H04L 12/64* (2006.01)

(52) U.S. Cl.
CPC ..... *H05B 37/0245* (2013.01); *H04L 12/6418* (2013.01); *H05B 37/0218* (2013.01); *H05B 37/0227* (2013.01)

(58) Field of Classification Search
CPC ............ H04L 12/6418; H05B 37/0218; H05B 37/0227; H05B 37/0245
See application file for complete search history.

(56) References Cited

U.S. PATENT DOCUMENTS

| 2008/0104212 A1 | 5/2008 | Ebrom |
| 2009/0184840 A1 | 7/2009 | Veskovic et al. |
| 2012/0129601 A1 | 5/2012 | Gronkowski et al. |

OTHER PUBLICATIONS

NX Distributed Lighting Controls System. Datasheet [online] Hubbell Inc., Apr. 6, 2015; retrieved from <URL:http://www.hubbell-automation.com/content/products/instructions/instructions_files/3453_NX_Network_Bridge_Module_Install_Sheet.pdf.pdf> (8 pages).
(Continued)

*Primary Examiner* — Monica C King
(74) *Attorney, Agent, or Firm* — Michael Best & Friedrich, LLP

(57) ABSTRACT

Systems and methods for controlling electrical loads in one or more areas. The system includes a room controller having a microprocessor for accessing data and providing commands, memory for storing information operably connected to the microprocessor, a relay for powering a load based on commands from the microprocessor, and a port for connecting a peripheral device. The system also includes a peripheral device connected to the port and configured to send data including a device type and a device instance byte to the controller indicating the type of peripheral device. The device instance byte includes a port number identifying the port and a slot number identifying a time slot within a time domain multiplexing cycle. The system also includes a load connected to the relay.

14 Claims, 21 Drawing Sheets

Related U.S. Application Data

(60) Provisional application No. 62/155,918, filed on May 1, 2015.

(56) References Cited

OTHER PUBLICATIONS

PCT/US2016/030173 International Search Report and Written Opinion dated Sep. 15, 2016 (15 pages).

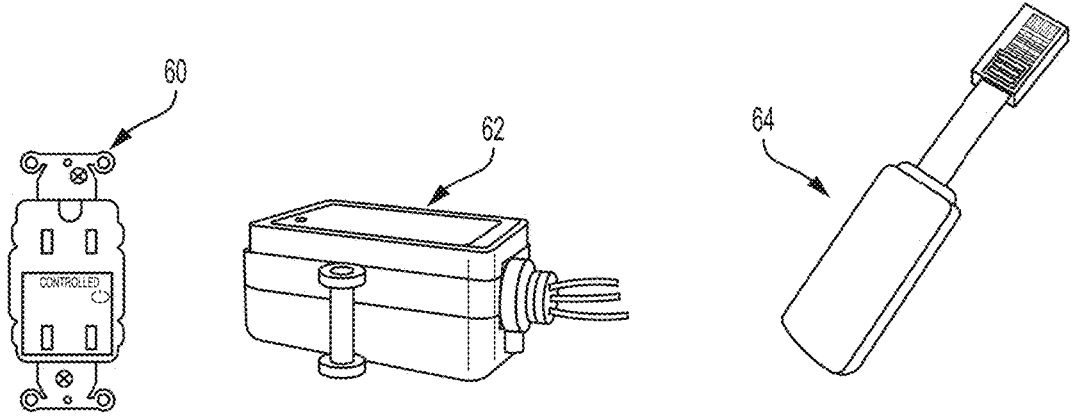
FIG. 12
FIG. 13
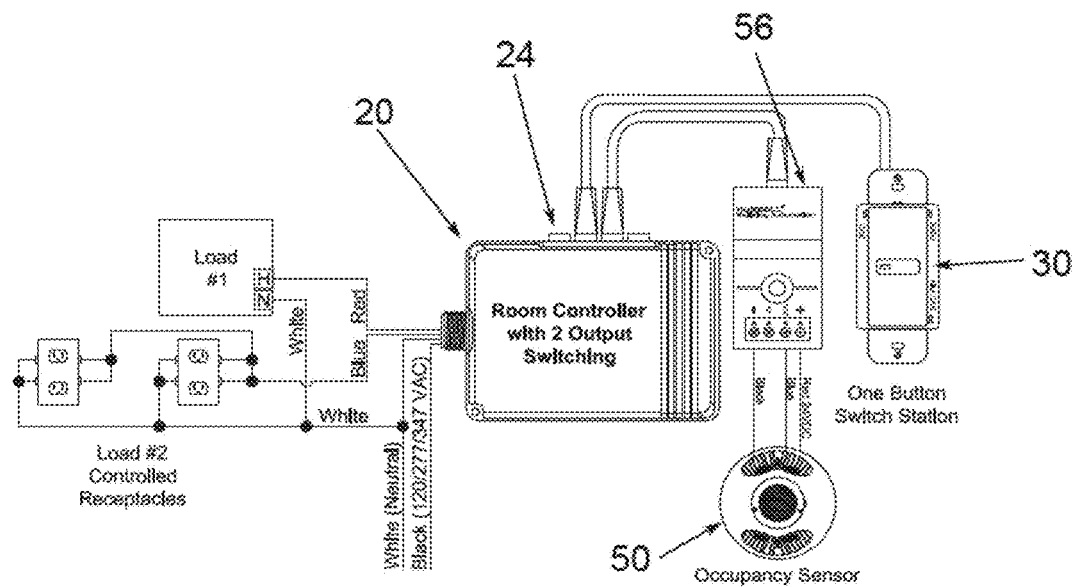
FIG. 14

DEVICES, SYSTEMS, AND METHODS FOR CONTROLLING ELECTRICAL LOADS

CROSS-REFERENCE TO RELATED APPLICATIONS

The present application is a continuation of, and claims the benefit of the filing date of co-pending U.S. patent application Ser. No. 15/142,900, filed Apr. 29, 2016, which claims the benefit of U.S. Provisional Patent Application No. 62/155,918, filed May 1, 2015.

BACKGROUND

Various lighting systems include electrical loads such as occupancy sensors, lighting fixtures, dimmer circuits, etc. Typically, occupancy sensors and/or dimmer circuits are coupled to a processor used to operate these devices in conjunction with light sources. Increasing the number of sensors, dimmer circuits for multiple rooms, zones or zones combined into areas and multiple areas to be controlled by a system increases the complexity of controlling electrical loads. Efficient methods and apparatus for controlling electrical loads are desired.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 shows a ceiling mounted occupancy sensor 50,

FIG. 8 shows a wall mounted occupancy sensor 52, and

FIG. 9 shows a daylight sensor 56. The occupancy sensors 50, 52 provide occupancy information on a given area and the controller 20 can adjust the loads accordingly, for example to turn on or off certain lights. The occupancy sensors 50, 52 can include passive IR and ultrasonic technology. The controller 20 is operably connected to one or more occupancy sensors 50, 52, for example with a CAT 5 cable and a RJ45 adaptor 56 as shown in FIG. 10.

FIG. 12 shows an exemplary embodiment of a plug and plug load controller.

FIG. 13 shows an exemplary wireless module connected to a controller in accordance to some embodiments.

FIG. 14 shows a controller connected to a first load and a controlled receptacle load in accordance to some embodiments.

Figure 1:
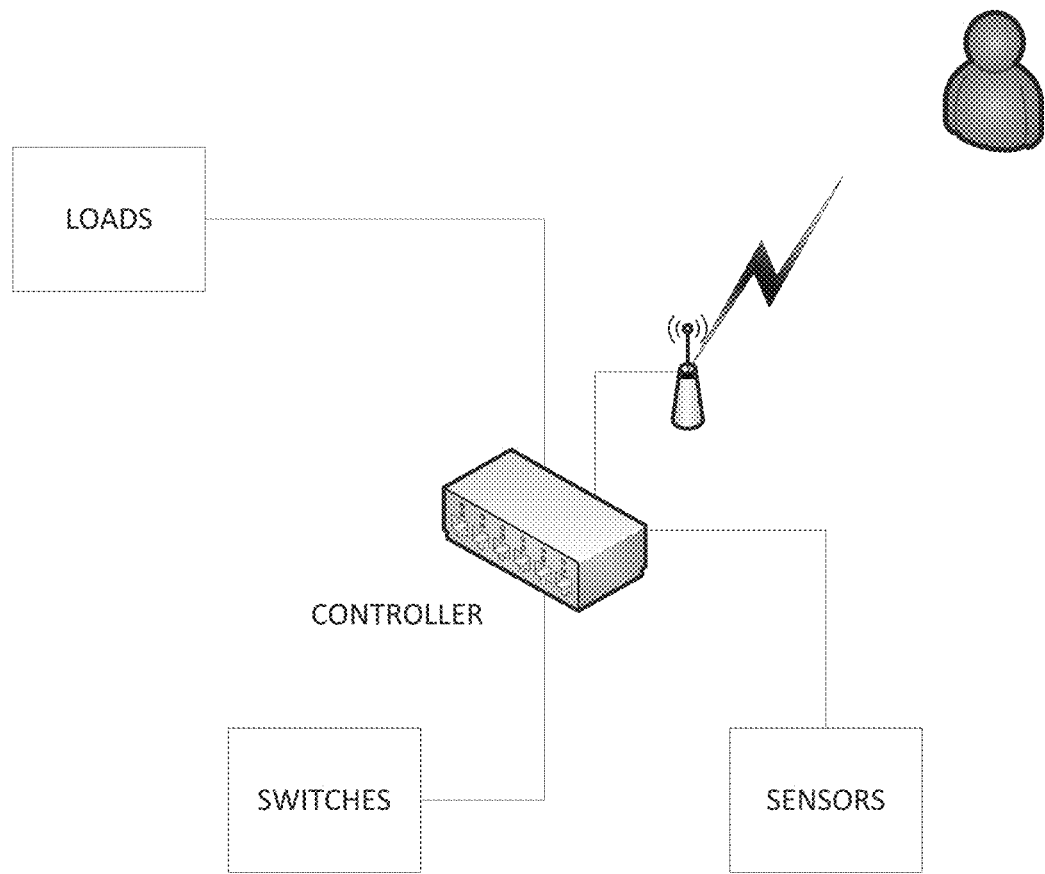
FIG. 1 is a central controller is optionally connected to one or more sensors, one or more switches, and one or more loads in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DESCRIPTION OF EXEMPLARY EMBODIMENTS

Various exemplary embodiments relate to devices and methods for control networks for controlling electrical loads, for example lighting control of a room or zones, multiple rooms or zones that are combined into areas, and multiple areas. In an exemplary embodiment, this can include loads across entire buildings and grounds that are separated by rooms, hallways, exterior, and interior components.

One way to architect control networks for automated controls is a hierarchical, peer-to-peer (P2P) architecture. P2P architectures lack single points of failures inherent in centralized-control architecture. In centralized-control architectures, messages from one device must go first to a controlling master or gateway before the signal can get to the target device. Therefore, every communication between two non-master devices includes an extra step, or fault possibility. P2P designs, by contrast, allow direct communication between two devices (Unicast), or from one device to many devices (Multicast), or even from one device to all devices (Broadcast). This is accomplished without the need for a master device, eliminating the fault possibility of the master controller and removing a potential performance bottleneck. In addition to enhanced system performance, P2P systems are much more fault tolerant. A specific device failure affects only that one device, not potentially many devices, or even the whole system, as would be the case in centralized-control architectures.

According to various exemplary embodiments, the lighting control system can include a network of devices and controllers designed specifically for lighting control applications. Device elements can include switches, occupancy sensors and daylight harvesting sensors. Controllers can include relays with On/Off capabilities and dimmers with 0 to 10 VDC dimming capabilities. Devices are deployed within a space to monitor changes such as occupancy or daylight and receive input such as the push of a button from a user. In certain embodiments, the function of these devices can be simply to monitor the space for changes and broadcast the changes they receive. They need not be responsible for the implementation of the control strategy, which can be the responsibility of a controller.

In one embodiment, the lighting system can employee an area/zone/group assignment strategy, for example 64 Areas, 64 Zones and 64 Groups. In some embodiments, the lighting system can employee 128 Areas, 128 Zones, and 16 Groups. A device or controller may be programmed to participate in only one Area; however, they may belong to one or all of the available 64 Zones and 64 groups within the Area. Assignments in the areas, zones, and groups can be made through a commissioning tool and/or method. To visualize this concept, the Area can be perceived as a method of separating buildings or floors, Zones to separate individual room or locations of control, and groups to configure control assignments within the room or location.

The hierarchical addressing scheme is useful for grouping related devices together for control. However, there are additional reasons for addressing devices that may not be directly related to control. For example, during a system firmware upgrade it is desirable to address all devices of a certain type, such as a toggle switch, independent of their assignment to control groups. This is important because the firmware files are different for different device types. In various exemplary embodiments, a new type of addressing known as typecast can handle this requirement.

Typecasting is a method of addressing based on identifying a device by its type instead of, or in addition to its grouping address. The NX Protocol is a wrapper around a payload of data that allows specification of destinations, message types, etc. for that payload. Addressing types can include unicast, group multicast, type multicast, and zone multicast.

Unicast messages are messages that are targeted at a specific device. They uniquely identify a device by MAC address and sub-device type and instance. This addressing ignores any area, zone, or group boundaries.

Group Multicast messages are messages that target devices belonging to specific groups specified by the Groups bit field in a specific area and a specific zone. The source address is included following area, zone, and groups to facilitate a Unicast response for discovery messages.

Type Multicast messages are sent to specific device types. Area, Zone and Groups can still apply. The type mask in the message is "ANDed" with the recipient device's type and if the result is equal to the type specified in the message, this message is to be processed. The source address is included following the area, zone, group and type information to facilitate a Unicast response for discovery messages. These messages are commonly called "typecast."

Zone Multicast messages are messages that target specific groups, specified by the Groups Bit field and specific zones, specific by the Zone Bit field, in a specific Area. These messages are commonly called "zonecast."

Broadcast messages are messages that target the entire network. They are a unicast format message where the Destination MAC, and sub-device type and instance are set to 0×FF. They can be limited in scope by providing a specific facility ID.

Additionally, Group Multicast and Type Multicast support a Broadcast value for Area and Zone using a value of 0×FF. If the Area is broadcast, the Zone must be broadcast also, or the Area can be defined and a broadcast Zone used. In either case, any combination of groups may be used.

In certain embodiments, an entire protocol message may be no longer than 64 bytes. The protocol overhead is 26 bytes in the header plus 2 bytes for CRC, for a total of 28 bytes of overhead (see below). This leaves a maximum of 36 bytes for payload.

| | | | | | | | | | "AZG Block" | | | | | |
|---|---|---|---|---|---|---|---|---|---|---|---|---|---|---|
| Offset | 0 | 1 | 2 | 3 | 4 | 5 | 6 | 7 | 8 | 9 | 10 | 11 | 12 | 13 |
| Unicast | Version | Header Extension | Facility ID | | Destination MAC | | | | Dest Sub Addr | | Source MAC | | | |
| Group Multicast | | | | | Area | Zone | Groups | | Dev Type Unused | Dev Inst | Source MAC | | | |
| Type Multicast | | | | | Area | Zone | Groups | | Dev Type | Type Mask | Source MAC | | | |
| Zone Multicast | | | | | Area | | | | | | | | | |
| Broadcast | | | | | 0xFF | 0xFF | 0xFF | 0xFF | 0xFF | 0xFF | Source MAC | | | |

| | Offset | 14 | 15 | 16 | 17 | 18 | 19 | 20 | 21 | 22 | 23 | 24 | 25 | ... | Payload + 1 | Payload + 2 |
|---|---|---|---|---|---|---|---|---|---|---|---|---|---|---|---|---|
| Unicast | | Src Sub Addr | | Seq# | | | Unused | | | | Msg Type | | Length | Payload | | CRC | |
| Group Multicast | | Src Sub Addr | | | | | Seq# | | | | | | Unused | | | | |
| Type Multicast | | Src Sub Addr | | | | | Seq# | | | | | | Unused | | | | |
| Zone Multicast | | | | | | | Zones | | Groups | | | | | | | | |
| Broadcast | | Src Sub Addr | | Seq# | | | Unused | | | | | | | | | | |

Header Extension

Header Extension is a bit field with the following values:

| Bit | | | | | | | |
|---|---|---|---|---|---|---|---|
| 8 | 7 | 6 | 5 | 4 | 3 | 2 | 1 |
| Meaning Addressing | | Encrypt | Forward | Local | Reserved | | |

Addressing indicates if the packet is a Unicast (0x00), group multicast (0x40), zone multicast (0x80), or type multicast (0xCo). Broadcast is determined by evaluating the MAC and sub-address in a unicast context (i.e., broadcast is a unicast with all 6 bytes of MAC and sub-address set to 0xFF).

Encrypt is not currently used, but would indicate the payload is encrypted.

Forward is set by slot devices that need messages forwarded to other ports & devices. It is used by BLE, the Ethernet bridge and similar devices to indicate to the port driver that the incoming message must be forwarded to all switch ports and any external devices.

Local is set for messages that should not be forwarded outside the local "blob" by a bridge or radio.

In an alternative embodiment, the header Extension might be renamed as 'addressing scheme'. Bit 8 would indicate a slot-9 forwarding request; all other bits would be used to represent.
e.g.:
0x00=loopback
0x01=unicast
0x02=group multicast
0x03=type multicast
0x04=zone multicast
0x7f=broadcast
0x80=slot-9 forwarding Exemplary components of the system can include: a graphical user interface; a database and web server that is onsite or cloud based; a building automated system interface; a facility and/or area controller; a network bridge; a WiFi or other wireless communication access point; a network multi-port hub; a network extender that can extend communication signals or cable runs; control panels; an input/output module; a zone manager or controller; a DMX interface module; a smart port controller; switches or switch stations; sensors including occupancy and daylight sensors; and dry contact switches.

In an exemplary embodiment illustrated in FIG. 1, a central controller is optionally connected to one or more sensors, one or more switches, and one or more loads. The controller can also include, or be connected to a communication device, for example a wireless communication device, for communicating with a user. The user can receive information and send instructions or commands to the controller to control the operation of the loads. The loads can be automatically controlled and adjusted by the controller based on a set profile, input from the switches, input from the sensors, and input from the user. In an exemplary embodiment, the controller will automatically respond to input from the user, switches, and/or sensors and adjust the power to the loads in the most energy efficient manner possible. Although the various exemplary embodiments discussed herein use lighting units as the loads, the devices and methods described herein can be adapted for use with other electronic devices.

Figures 2, 3:
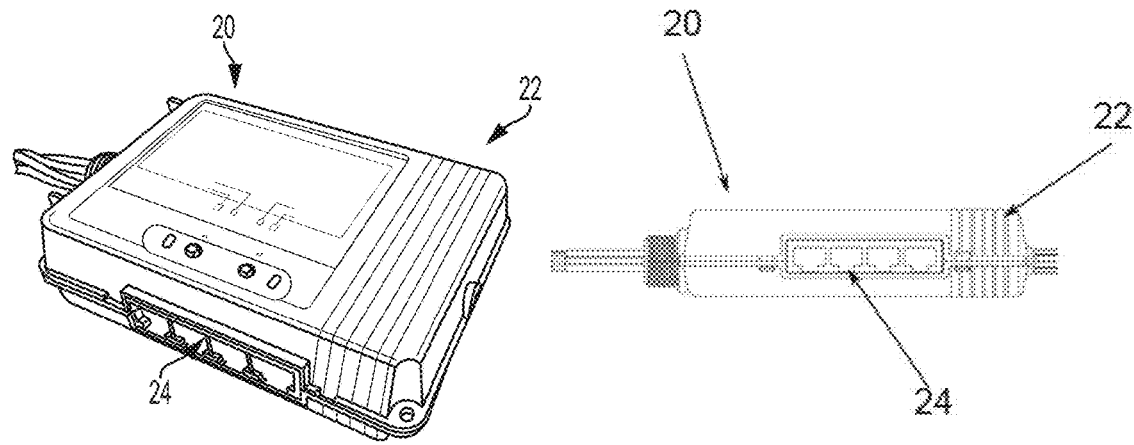
FIGS. 2 and 3 show a controller in accordance with some embodiments.
Figure 3A:
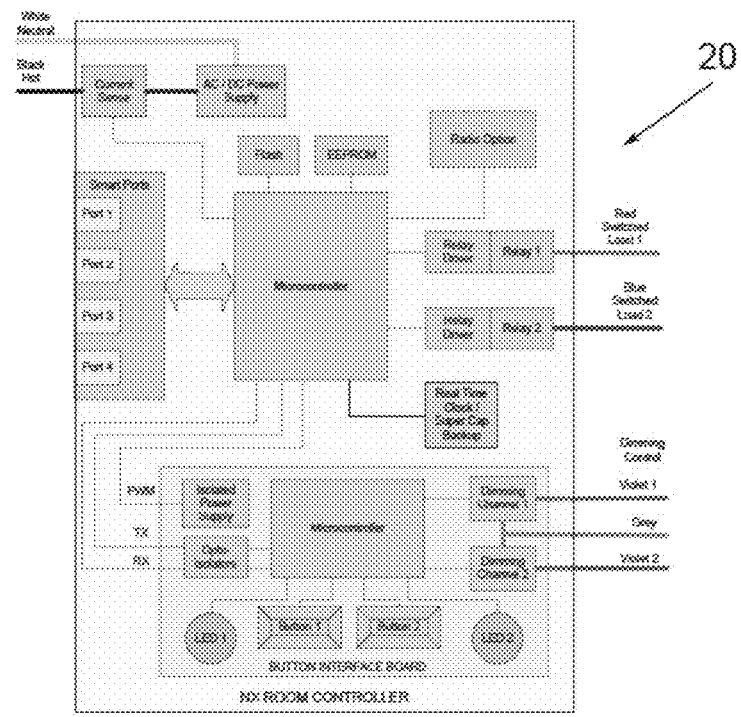
FIG. 3A shows an schematic of an exemplary controller in accordance to some embodiments.

FIGS. 2 and 3 show an exemplary embodiment of a controller 20. The controller 20 includes an outer housing 22 and one or more ports 24. The ports 24 receive a conductor to connect different components to the controller 20. In an exemplary embodiment, the conductor is a CAT 5 or CAT 5e cable, although other conductors can be used. The controller can include one or two independently controlled relays that can be alternatively configured for smart, bi-level switching for controller loads in groups. The controller 20 can be configured to provide one or two dimming control signals for the loads, for example 0-10V DC control signal output that can control dimmable ballasts and LED light sources. More than one controller can be connected to form a network to control a large number of loads. For example, eight controllers 20 can be connected to provide bi-level and dimming control of sixteen loads. The controller 20 can be wired directly to a load or can be configured to interact with a receptacle, either through a hard-wired connections or through wireless communication. FIG. 3A shows an schematic of an exemplary controller 20.

In an exemplary embodiment the controller 20 includes smart port technology that automatically recognizes and configures devices that are connected to the ports 24. The controller 20 can be configured to periodically send out a signal to request information on components connected to the ports 24. Different components can respond to this discovery request to identify what type of devices are connected to the controller 20, including other controllers. In an exemplary embodiment, each Smart Port 24 implements a separate RS-485 half-duplex, master/slave serial port. All data transferred over the smart port 24 using standard UART format. The baud rate is 115.2K. The character format is 8 data bits, no parity, and 1 stop bit (8, N,1). The UART is connected to a standard RS-485 transceiver. All RS-485 communication occurs over a single twisted wire pair which provides a half-duplex data pipe. The Smart Port 24 and the Room Controller 20 may act as the master and all other RS-485 devices act as slaves. A Time Domain Multiplexing scheme is employed to control the utilization of the data pipe. The time domain is sliced into equal "time slots" by the master. In round robin fashion, each device on the pipe is allowed a time slot in which to send a data packet containing up to a maximum of 64 characters. After each device is given the opportunity to send exactly one packet, the process is repeated. A total of 10 time slots of 10 ms each, are set aside within each repeated cycle. This allows up to 10 devices to share the pipe with a total cycle time of 100 ms. The time to send a single byte (including start and stop bits) is 86.06 us. The master sends a sync frame to indicate the start of each time slot [4 bytes=0.3472 ms]. The slot device then sends a single data packet if there is any data to send [Up to 64 bytes=5.56 ms max]. This means that theoretically, the slot data packet must begin within 4 ms of the end of the sync packet to fit the packet within the available slot time [10 ms–5.56 ms–0.3472 ms=4.0928 ms dead time available]. In practice, the Master always waits 1 ms after sending the slot 0 sync frame before sending the Master Packet. A slave device should start sending it's slot data packet as soon as possible following the receipt of its slot sync frame.

Devices connected to Smart Ports 24 are allocated slots in the TDMA cycle as defined in Table 3-2.

TABLE 3-2

Smart Port Time Slot Allocation

| Device | Slot |
|---|---|
| Master | 0 |
| Switches | 1-8 |
| BLE | 9 |

For switches, the slot address is set via a rotary selector. Each switch device should be set to a unique slot number. The Master uses Sync frames to indicate the start of each time slot. The Sync frames are 4 byte (347.24 us) messages. Each contains a fixed start of Sync frame character, a data character listing the slot number, a byte stating whether the slot is assigned and to what type of unit, and a simple checksum as shown in Table 3-3.

TABLE 3-3

Smart Port Sync Frame Format

| BYTE | 7 | 6 | 5 | 4 | 3 | 2 | 1 | 0 |
|---|---|---|---|---|---|---|---|---|
| 0 | | | Sync Frame Start (0x02) | | | | | |
| 1 | Port# | | | | Time Slot# | | | |
| 2 | | | Deprecated | | | | | |
| 3 | | | Checksum | | | | | |

Note: Byte #2 is no longer used but is still included for legacy compatibility. Each packet can be up to 64 bytes long. For Unicast messages, Device Type and Device instance are mapped into Sub Address as shown in Table 3-4.

TABLE 3-4

Smart Port Data Packet Format
Sub Address

| Device Type | Device Instance |
|---|---|

The Device Instance byte is made up of the port and slot numbers. The bit packing is shown in Table 3-5 and is identical to that used in byte #1 of the Sync frame.

TABLE 3-5

Smart Port Device Instance Byte Definition

| 7 | 6 | 5 | 4 | 3 | 2 | 1 | 0 |
|---|---|---|---|---|---|---|---|
| Port# | | | | Time Slot# | | | |

In an exemplary embodiment, the controller 20 can include one or more override buttons that allows a user to directly control the loads at the controller. For example a quick press of the override button can toggle the state of the load while a prolonged press of the button can cause the load to slowly lower to a minimum or raise to a maximum level. Release of the button will cancel the lower or raise to leave the light at a desired level. This can also allow an installer to verify operation of the controller prior to setting up other manual controls.

Figure 4:
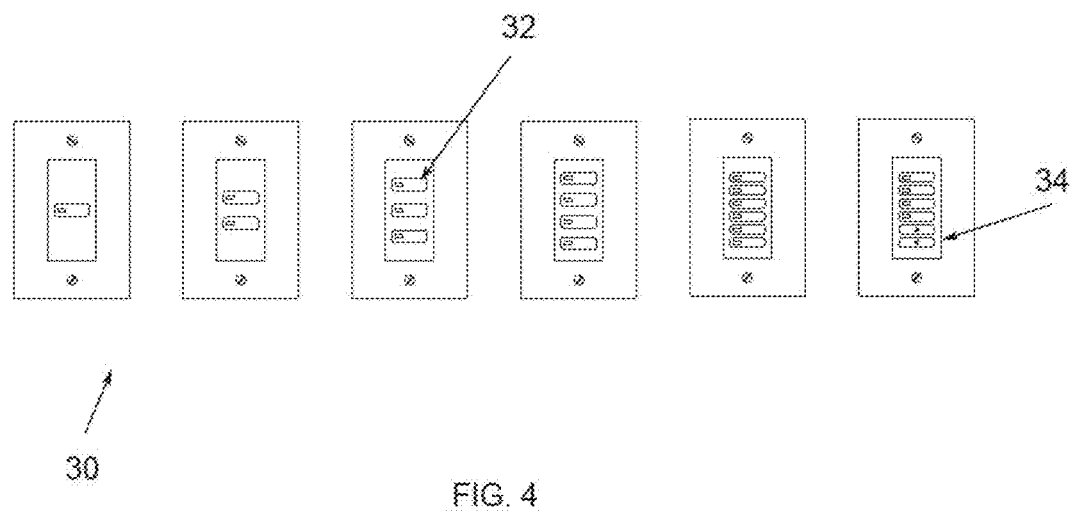
FIGS. 4 and 5 show various exemplary embodiments of switches that can be used with the controller.
Figure 5:
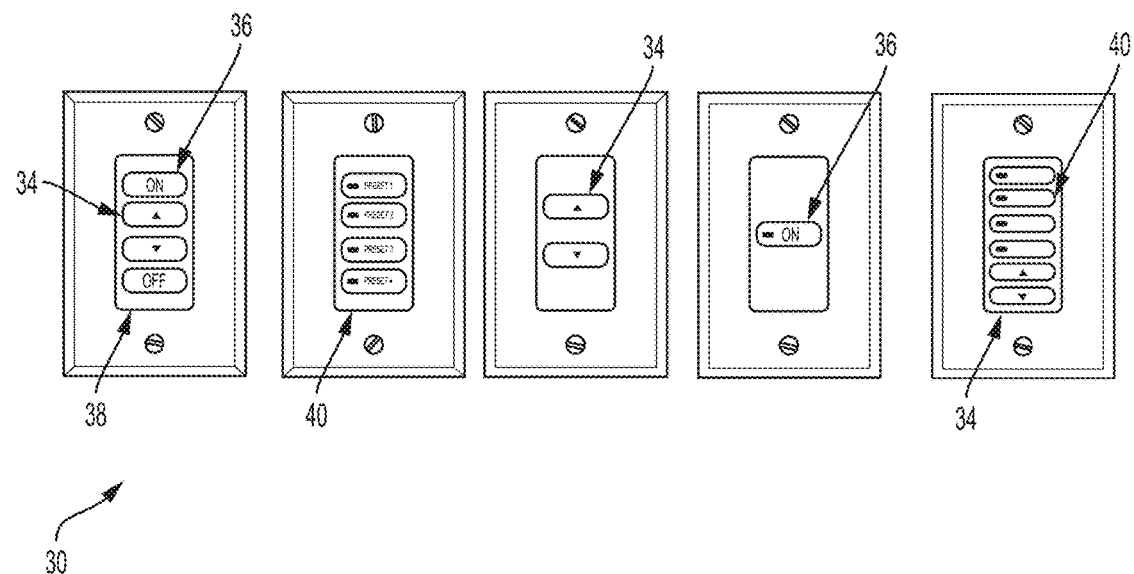

FIGS. 4 and 5 show various exemplary embodiments of switches 30 that can be used with the controller 20. The switches 30 allow for manual control of the system by a user. The switches are can be connected with other devices and can be used to control individual loads or a group of loads. In certain exemplary embodiments, the switches 30 can be smart switches that can perform other functions, for example that are capable of communicating with other components in the system or identifying themselves to the controller 20.

FIG. 4 shows a first set of switches 30 that include one or more buttons 32, for example on/off buttons and one or more raise/lower buttons 34 that can raise or dim lights. The exemplary embodiments shown in FIG. 4 include a single-button switch, a two-button switch, a three-button switch, a four-button switch, a six-button switch, and a four-button and raise/lower switch. Different combinations of buttons 32, 34 can be included in a single switch 30 as would be understood by one of ordinary skill in the art.

FIG. 5 shows a second set of switches 30 that include raise/lower buttons 34, on buttons 36, off buttons 38, and preset buttons 40. Different combinations of these buttons can be combined on a single switch 30. The preset buttons can include a standard lighting configuration or can be programmed by a user. For example, the preset buttons 40 can have different set dimming levels, such as 100%, 75%, 50%, and 25%. The user can also set one or more lights to a certain level or on/off state and have the preset button learn the set condition. Other methods of programming the presets, for example through a user device such as a computer or smart phone.

In an exemplary embodiment, the buttons 32, 34, 36, 38, 40 can include an indicator, for example an LED status indicator that is on when the controlled load is activated. When there are multiple switches with pilot lights in the same zone, controlling the same loads, it is necessary for the status of all of the pilot lights to indicate the proper state of the controlled load. This is known as annunciator coherency. A complication with the implementation of annunciator coherency is that individual switches may be grouped to control different loads so that there is some overlap in the controlled loads, but not necessarily a one-to-one correspondence.

Figure 6:
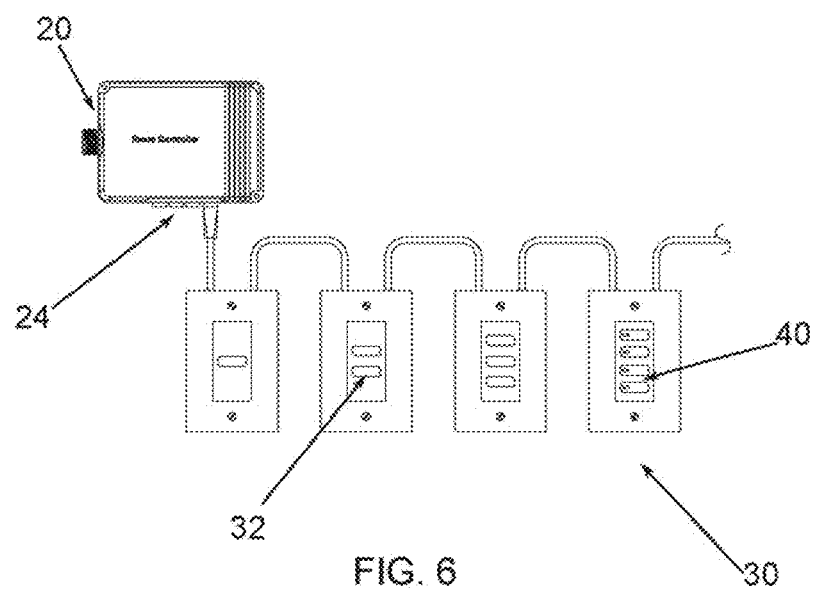
FIG. 6 illustrates that more than one switch can be connected together in series to a single port in accordance to some embodiments.

The switches 30 can also be configured to perform different functions or control other electrical components of a room. As best shown in FIG. 6, more than one switch can be connected together in series to a single port 24. In an exemplary embodiment, the switches 30 are connected using a CAT 5 or CAT 5e cable, although other conductors can be used.

In an exemplary embodiment, the switches 30 are addressable so that they can be assigned to one or more loads through the controller 20. In an exemplary embodiment, lights and/or groups of lights connected to the controller are assigned a unique address, for example a number within a specific range. The switches 30 can also be assigned a number within the specific range that corresponds to a light or a group of lights. For example, the switches 30 can include a multi-positionable switch that can be set to a corresponding number, such as a rotary switch.

According to exemplary embodiments, a method of messaging is implemented which provides annunciator coherency within a control zone. If a switch controls a load in more than one group, it can be important for the LED indicator to correctly show if it's associated load is on or off. This can be complicated where a load is activated by another component or group. For example, where a first switch is segmented into a first group controls a load that is in the first group and a load that is in the second group, it is important for the first switch to know if the load has been turned on by a second switch that is part of the second group. The first switch may not be aware of the load because it only listens to messages from group 1. Accordingly, a command or mechanism is provided to inform the first switch of the status of its associated load, regardless of the loads grouping. The controller 20 or the load itself can provide information to the switch as needed. For example a message can be sent to the system that a member of group one and group two is on because the load knows the groups to which it has been assigned. The load can then respond to commands for those groups and after receiving an ON command for a group to which the load is assigned, the load sends a coherency message indicate all of the groups it is in should now be considered on. For example, a controlling device sends a Group 1 ON command. A load turns on because it is in Group 1, but it is also in Group 2 so the load sends out a coherency message that indicate that any annunciator representing Group 1 or 2 should be ON because one of their members is on.

The Switch coherency data fields include the state of actuators, for example up to 16 actuators, the most recent Preset value with a flag to indicate if the Preset value is valid, and the status of Manual Config. There are reserved bits to be used to indicate of Timed-On is on progress. Coherency is implemented in 3 bytes in the SmartPort Sync Message:

```
uint16_t u16Groups;      //Bytes 2 and 3
struct Presets {
uint8_t bf4Preset : 4;   // Note this field is 0 based; while presets are 1 based
uint8_t bEnable : 1;     // indicates Preset value is valid
uint8_t bManCfg : 1;
uint8_t bfReserved : 2;
};
```

A controller or other smart port driving device can be responsible for setting these data structures based on the last known system status of actuators and Presets. The status of up to 16 actuators can be send per sync. It is possible for the coherency data to be varied between ports, or to be set on a per sync basis. In this case each switch receives a unique coherency value. This allows the status of different areas and zones to be sent to each switch 30. The switches 30 receive the coherency data on every sync packet. They can select to listen only to the sync packet that corresponds to their slot number, or they can listen to all sync packets. All switch types monitor the ManConfig flag to determine if the system is being actively configured. Both toggle and preset switches 30 can use the coherency information to set their annunciators.

With toggle switches the button's group mask has one or more bits that are on the group coherency field, the annunciator for that button it illuminated. Only of there is no match between the button group field and the coherency bit filed is the annunciator extinguished. Preset switches use the preset fields having a value between 0-15 (one less than Preset numbers) and the bEnable bit defines if the Preset value is valid. A Preset annunciator follows the Preset value. If the bEnable is set and the Preset value corresponds to the button's Preset number, the annunciator for that button is illuminated. If bEnable is not set, or bEnable is set and the button's Preset number does not correspond to the coherency Preset value, that button's annunciator is extinguished.

A bManConfig flag is set when manual configuration is active in the system. It is not an indicator of whether the system has previously been manually configured, only that it is at present being manually configured. Switches set their ManConfig annunciator when this flag is set.

Figure 7:
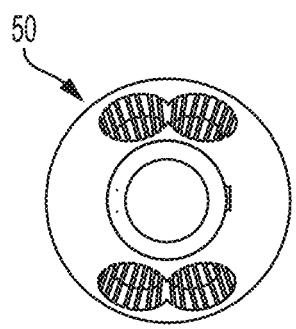
FIGS. 7-9 show exemplary embodiments of sensors that can be connected to the controller 20.
Figure 8:
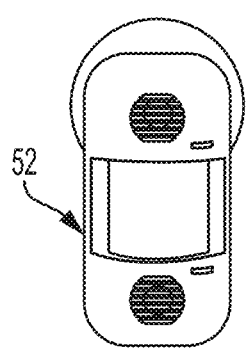
Figure 9:
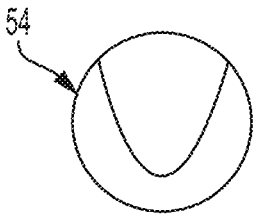
Figure 10:
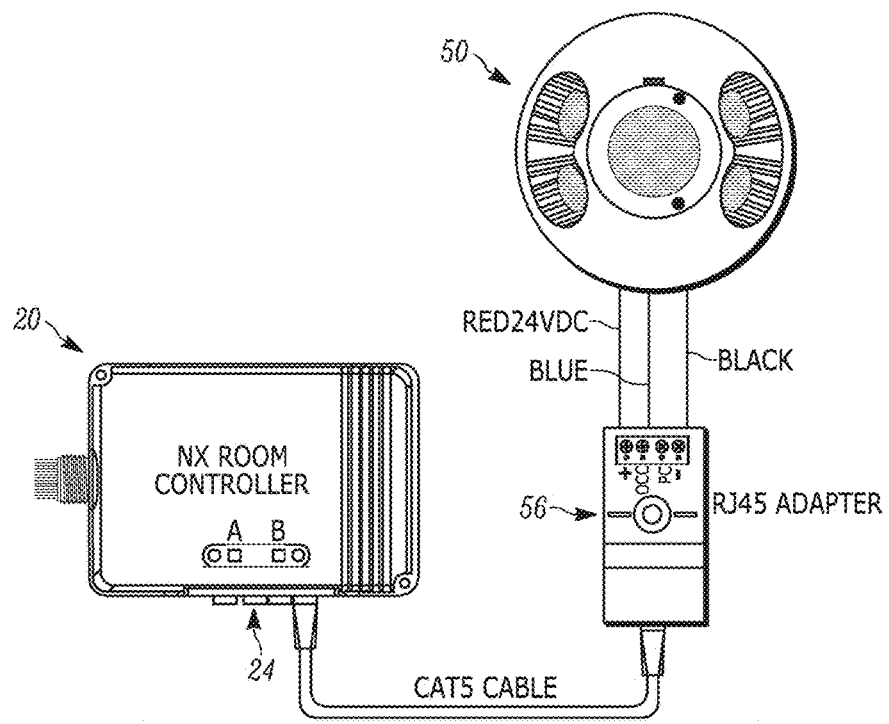
FIG. 10 shows a controller operably connected to one or more occupancy sensors with a CAT 5 cable and a RJ45 adaptor in accordance to some embodiments.

FIGS. 7-9 show exemplary embodiments of sensors that can be connected to the controller 20. FIG. 7 shows a ceiling mounted occupancy sensor 50, FIG. 8 shows a wall mounted occupancy sensor 52, and FIG. 9 shows a daylight sensor 56. The occupancy sensors 50, 52 provide occupancy information on a given area and the controller 20 can adjust the loads accordingly, for example to turn on or off certain lights. The occupancy sensors 50, 52 can include passive IR and ultrasonic technology. The controller 20 is operably connected to one or more occupancy sensors 50, 52, for example with a CAT 5 cable and a RJ45 adaptor 56 as shown in FIG. 10. In an alternative embodiment, the occupancy sensor 50, 52 can plug into the controller 20 with only a single cable. Types of occupancy sensor that can be used are described in U.S. Pat. No. 8,461,510, the disclosure of which is incorporated by reference in its entirety.

Figure 11:
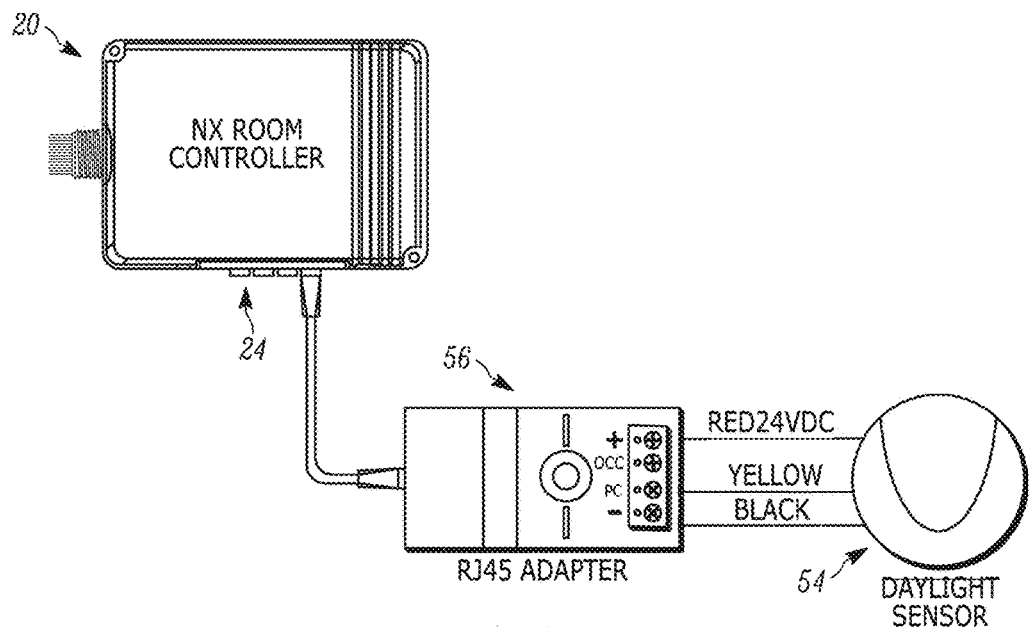
FIG. 11 shows a controller operably connected to one or more daylight sensors with a CAT 5 cable and a RJ45 adaptor in accordance to some embodiments.

The daylight sensor 54 measures light in a given area, for example with a photocell or diode. The daylight sensor 54 can continuously measure daylight levels and send the information to the controller 20 which can dim or turn on or off lights accordingly. The controller 20 is operably connected to one or more daylight sensors 54, for example with a CAT 5 cable and a RJ45 adaptor 56 as shown in FIG. 11. In an alternative embodiment, the daylight sensor 54 can plug into the controller 20 with only a single cable.

FIG. 12 shows an exemplary embodiment of a plug 60 and plug load controller 62. The plug load controller connects to a port 24 of the controller 20 which controls power distribution to the plug 60. In an exemplary embodiment, non-essential equipment in a room can be connected to the plug 60 and turned off when the room is unoccupied.

FIG. 13 shows an exemplary wireless module 64 that can be connected to the controller 20 or any device connected to the controller 20, for example one of the switches 30. The wireless module 64 provides a wireless communication bridge between the controller 20 and a user device, for example a smart phone, tablet, computer, or other wireless communication enabled device. In an exemplary embodiment, the wireless module 64 can operate via Bluetooth, although other wireless communications can also be used.

According to various exemplary embodiments, a program is provided that allows a user to the control the loads connected to the controller 20. Any type of program can be used, including computer programs or applications for phones, tablets, TVs, or other devices. Various complex applications can be achieved with the controller 20 and selected by a user including daylight harvesting. Daylight harvesting can utilize daylight sensor 54 and a controller 20 connected to dimmable loads. The controller 20 receives signals from the daylight sensor 54 about the amount of light in a room and adjusts the dimmable loads so that the combined light output stays at a certain level. A switch 30 with a raise/lower button 34 can be used so that users can also manually adjust the level of light in the room, temporarily overriding the automatic control. The time period for override can be a set amount of time or until an occupancy sensor determines vacancy in the room. Light from different sources is additive so the contribution of natural light can be used in conjunction with the contribution of controlled artificial light to produce the specified lighting level in the appropriate space. Reducing the output of the artificial light reduces the energy usage of the fixture while still producing the required design light level due to the presence of natural light in the space. Configuration of Daylight Harvesting usually requires a user interface with several variable inputs, including Design Level, Daylight at Task, Daylight at Sensor and Dimming Type. However, there are situations where it is not necessary to completely tune the operation of the daylight harvesting. In these cases, preprogrammed configurations can suffice and a method is provided to configure these scenarios with a simple user interface.

Figure 15:
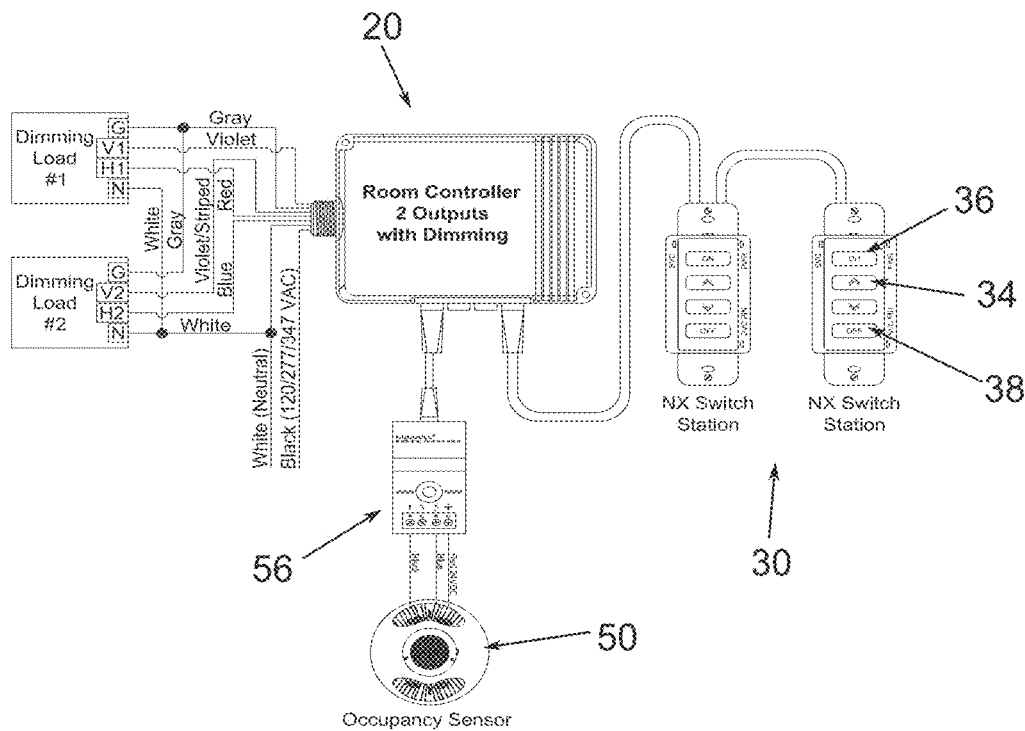
FIG. 15 shows a controller connected to a first and second dimming load in accordance to some embodiments.
Figure 16:
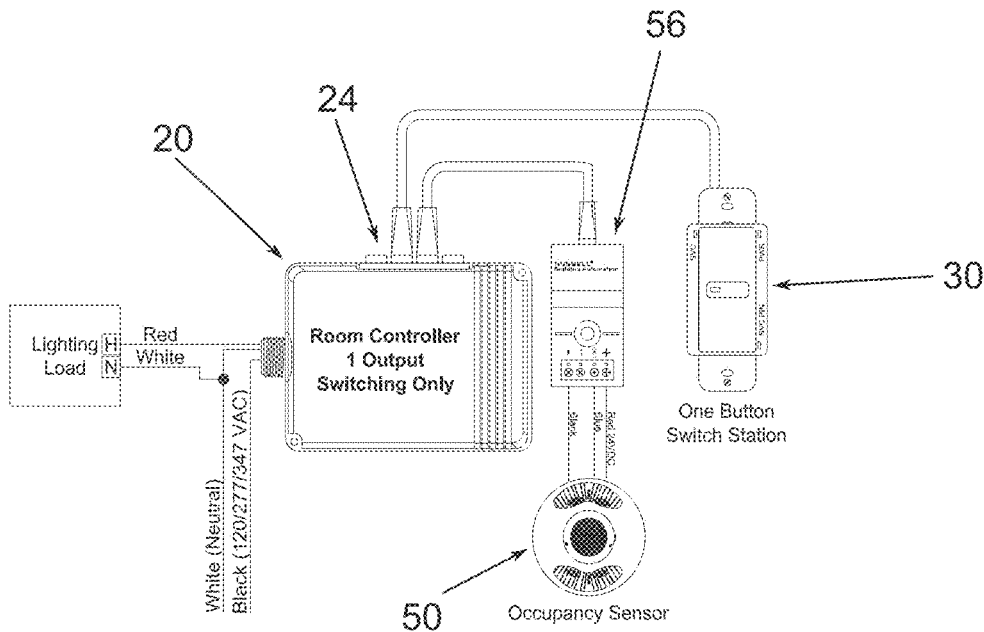
FIG. 16 shows a controller connected to a lighting load in accordance to some embodiments.
Figure 17:
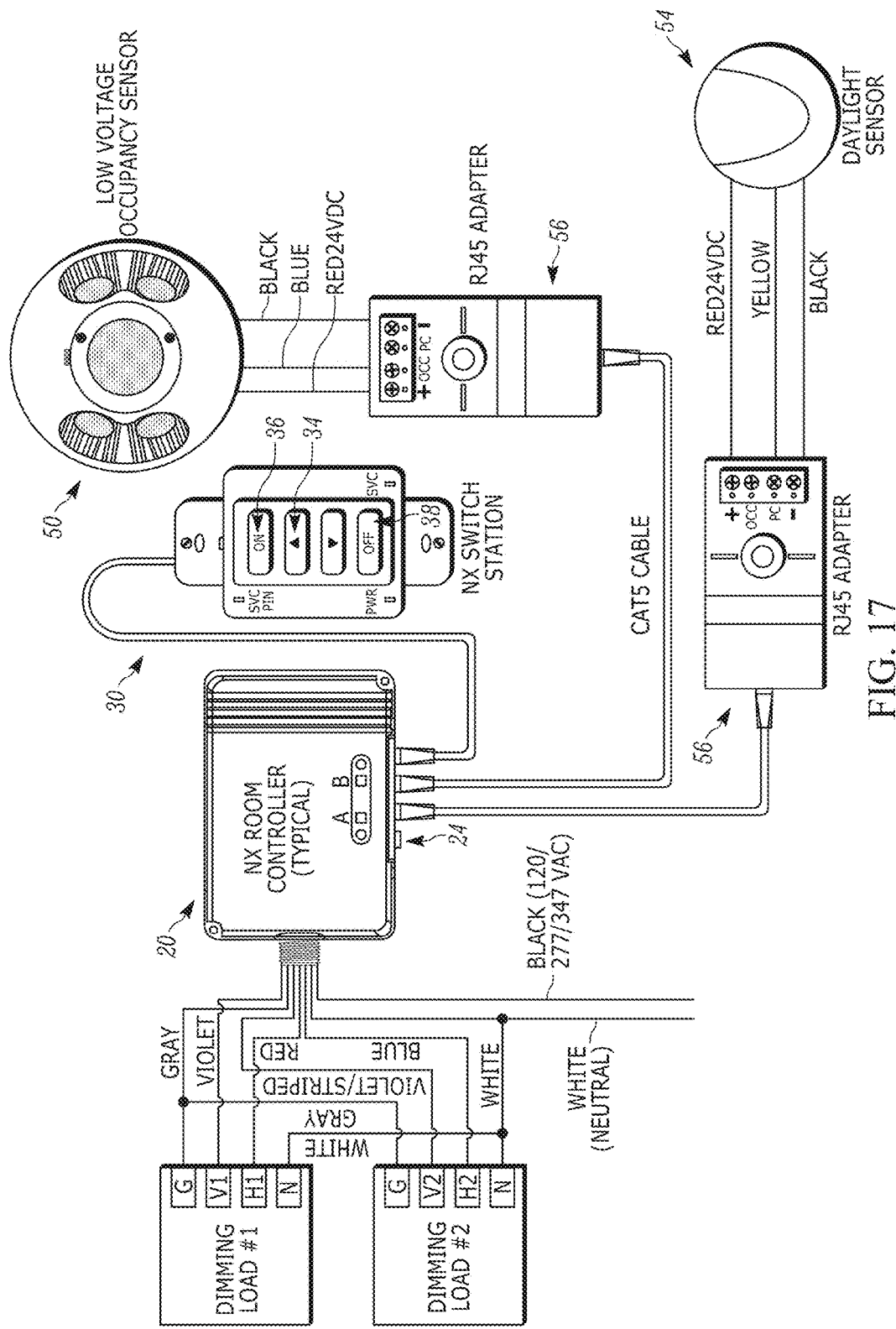
FIG. 17 shows a controller connected to a first and second dimming load in accordance to some embodiments.
Figure 18:
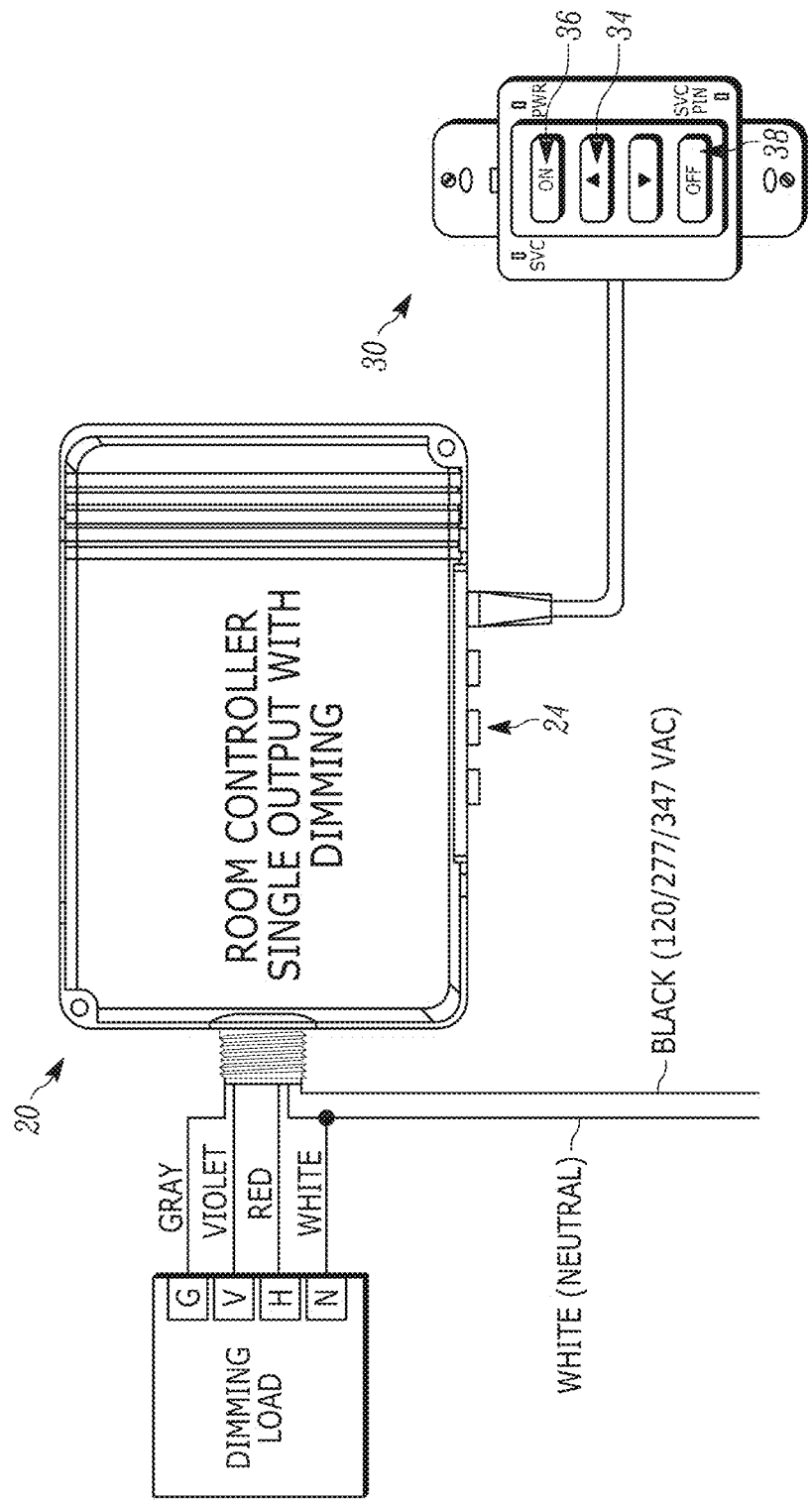
FIG. 18 shows a controller connected to a dimming load in accordance to some embodiments.
Figure 19:
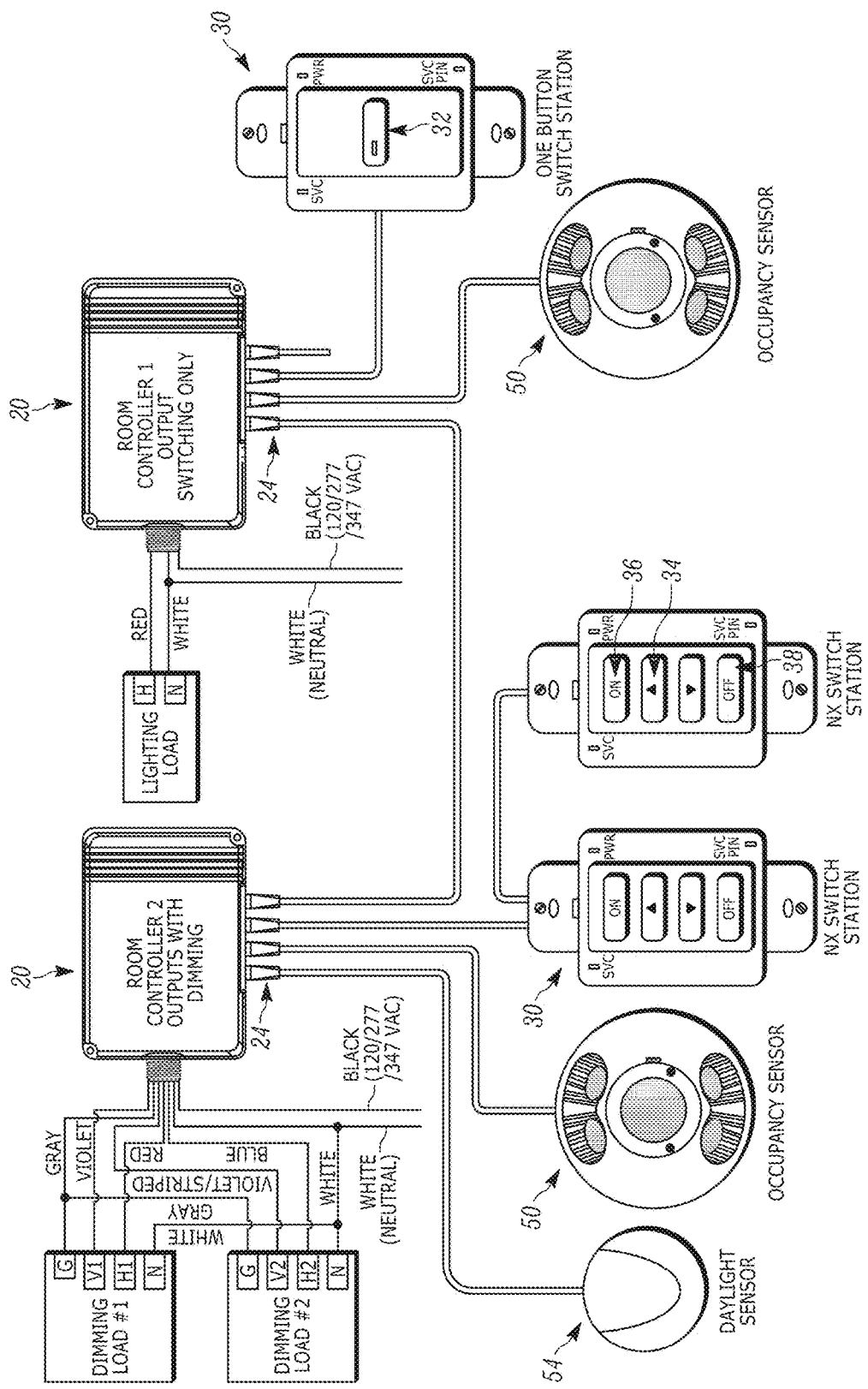
FIG. 19 includes two controllers, with a first controller connected to a first and second dimming load and a second controller connected to a lighting load in accordance to some embodiments.

FIGS. 14-19 show various exemplary setups using the exemplary components described herein. FIG. 14 shows a controller 20 connected to a first load and a controlled receptacle load. A single button switch 30 is connected to the controller 20. An occupancy sensor 50 is also connected to the controller 20 through an RJ45 adaptor 56. In this embodiment, the switch 30 can control the first load and the controller 20 can shut off power to the first load or the receptacle load when the occupancy sensor 50 fails to detect a presence in the room, although alternative control configurations can be used. FIG. 15 shows a controller 20 connected to a first and second dimming load. First and second switches 30 having on and off buttons 36, 38 and dimming controls 34 are connected to the controller 20. An occupancy sensor 50 is also connected to the controller through an RJ45 adaptor 56. In this embodiment, the first switch 30 can be addressed to control the first dimming load and the second switch 30 can be addressed to control the second dimming load. The controller 20 can shut off or dim one or both loads when the occupancy sensor 50 does not detect a presence in the room and turn on or raise one or both loads when a presence is detected, although alternative control configurations can be used. FIG. 16 shows a controller 20 connected to a lighting load. A switch 30 with a single button 32 and a occupancy sensor 50 are connected to the controller 20. The occupancy sensor 50 is connected with an RJ45 adaptor. In this embodiment, the first switch 30 can be addressed to control the first load and the controller 20 can shut off the load when the occupancy sensor 50 does not detect a presence in the room and turn on the load when a presence is detected, although alternative control configurations can be used. FIG. 17 shows a controller 20 connected to a first and second dimming load. A switch 30 having on and off buttons 36, 38 and dimming controls 34 is connected to the controller 20. An occupancy sensor 50 and a daylight sensor 54 are also connected to the controller through RJ45 adapters 56. In this embodiment, the switch 30 can manually control the first and second dimming loads, the occupancy sensor 50 can shut off or dim the loads when a presence is detected, and the daylight sensor 54 can dim or raise the lights depending on the amount of daylight, although alternative control configurations can be used. FIG. 18 shows a controller 20 connected to a dimming load. A switch 30 having on and off buttons 36, 38 and dimming controls 34 is connected to the controller 20. In this embodiment, the switch 30 can manually control the dimming load. FIG. 19 includes two controllers 20, with a first controller 20 connected to a first and second dimming load and a second controller 20 connected to a lighting load. A daylight sensor 54, occupancy sensor 50, and a pair of switches 30 having on and/off buttons 36, 38 and dimming controls 34 are connected to the first controller. An occupancy sensor 50 and a single button switch 30 are connected to the second controller. The first and second controllers 20 are connected by a conductor, for example a CAT 5 cable, although other conductors and wireless connections can also be used. In this embodiment, the first and second switches 30 connected to the first controller 20 can control the first and second dimming loads and the switch 30 connected to the second controller 20 can control the lighting load. The first and second controllers 20 can control the first dimming loads and the lighting load based on input received from the daylight sensor 54 and the first and second occupancy sensors 50.

In various exemplary embodiments, multiple controllers 20 are connected together to form different zones. Multiple controllers 20 are capable of handling larger numbers of loads or groups of loads. When connected together through the ports 24, the controllers 20 can allocate greater resources to communicate with one another. It is possible to connect switch stations 30, occupancy sensors 50, 52 and daylight sensor 54 to any controller 20 within the zone and share functionality across all controllers 20 in the zone. If a zone contains more than one controller 20, that loads are assigned based on the numeric value of the MAC address for the controller 20. For example, the controller 20 with the highest MAC can contain load #1 and the controller with the next highest MAC will have the next load or loads and so on. The occupancy sensor 50, 52 will automatically control all loads up to the maximum allowed. Switch stations with 1, 2, and 4 buttons shall automatically associate with loads 1-4 respectively. Additional like stations shall control the same loads as their equals. For example, two four button stations plugged in a zone with at least four loads will both control loads 1-4. When there are more loads than buttons, the last button will control all remaining loads. Controller to controller coherency is handled using actuator state change messages.

When multiple controllers 20 are connected in a single zone, the controller with the highest MAC address can become the zone master and any associated area controller 80 will communicate directly with the zone master. While different controllers can receive information and control different groups, the zone master can also become the aggregator of zone information. The zone master can also be responsible for informing higher level components, such as area controllers 90 on connected devices in their zone to prevent overlap of multiple controllers 20 communicating with an area controller 80.

One use case for more than one controller 20 in a zone is the need to control two voltages in the same zone (i.e. 120 and 277 volts). This will present the case where power is removed and re-applied to only one of the room controllers 20. The system can be designed and tested to recover from such a situation with minimal negative results.

In an exemplary embodiment, devices connected together within a zone, including multi-controller configurations can have a default operation such that all loads in the zone are controlled so that no devices or loads in a zone are uncontrolled. For example, a one button switch 30 connected to a two relay controller 20 would control both loads. An occupancy sensor 50, 52 in a specific zone can control all the loads in that zone. If a zone contains an occupancy sensor 50, 52 only, for example where no switches 30 are present, the controller 20 is configured as an auto on/off based on the signal from the occupancy sensor 50, 52. Regardless of an occupancy sensor 50, the first switch station button will control relay one, second button will control relay two. All switch stations 30 connected will follow with the same button configuration (multi-way switching). In an exemplary embodiment, all buttons in excess of the number of loads will not control any loads and the LED will blink three times when pressed to indicate the button has not been configured. To accomplish the default load to button assignment, it is assumed that loads will default to group membership such that relay 1 will be in group 1 and relay 2 will be in group 2 by default. Toggle buttons 32 on the same switch station will default to group association from the top down. Top button will be in group 1, second button will be in group 2, etc. Group associations can be changed by a user, for example through a control point, such as the smart phone app or buttons on the controllers 20.

On and off buttons 36, 38 can auto configure using the same rules as the toggle button 32 above where the two button pair are treated similar to one toggle button 32. A three button high/low/off switch station can auto configure such that the "low" button will turn relay 1 On, all other relays Off and set all dimmers to 10%. The "high" button will turn all relays On, and set all dimmers to 100% The "off" button turns off all relays in the zone. Where there are more than one raise/lower switches 34 dimmers will auto configure similar to relays, and all raise/lower switches 34 in a zone will control all dimmers in the zone. A one button, toggle timed On switch can default to control all relays in the zone and set the time to 1 minute. A four button preset switch station will default to controlling all loads (relays and dimmers). Dimmers will be at 100% in preset 1, 75% in preset 2, 50% in preset 3 and 25% in preset 4. Fade time defaults to 5 seconds for all presets. A two button Gen/AV switch station can default to the "GEN" button to turn all relays On and set all dimmers to 100%. The "AV" button turns relay 1 On, turns all other relays Off, and sets all dimmers to 10%.

Figure 21:
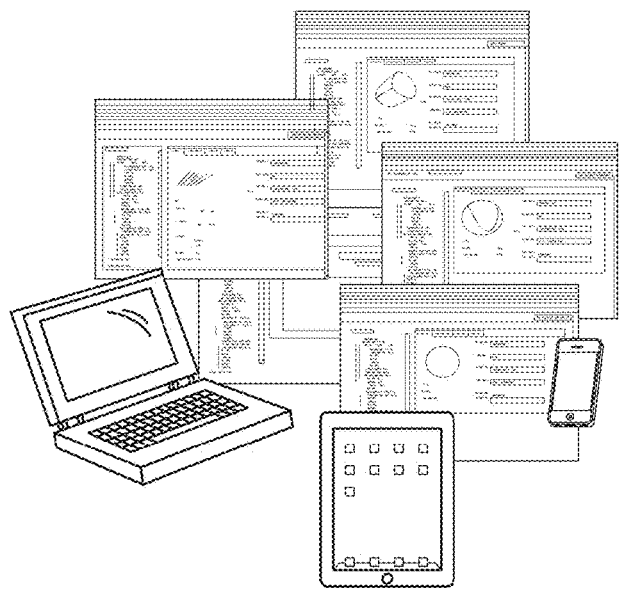
FIG. 21 shows representative graphical user interface in accordance to some embodiments.

In an exemplary embodiment, the loads in a zone or area can be configured by a user at a control point, which can be any type of user interface, including manual buttons, switches, graphical user interface, computer programs, software applications, device applications, or either interface either locally or remotely connected to the system. For example a smart phone app can be provided that allows a user to connect to a controller 20 or other components in the zone and establish a control configuration. An exemplary representation of the interface is shown in FIG. 21. A control configuration can also be established at the controller 20 using buttons and LED indicators that are present on the controller 20. Different configuration modes can include: 1. Load configuration that sets the occupancy/vacancy mode for each relay and re-assign relays to buttons (changes default assignments); 2. Daylight dimming configuration that associates dimmers to the photocell; 3. Auto daylight calibration; and 4. Reset the room to factory default settings. If a reset is done with the room devices connected, the room will re-arbitrate default settings for the connected devices.

In an exemplary embodiment, the control point allows for configuration of different zones. A user can also create and save a zone profile to apply it to different zones. This saved profile can eliminate specific MAC address and can structure the commands to each zone to fit the similar components in a zone. For example, a user can create a profile for a first zone that has a pair of dimmer loads, a switch that includes raise/lower buttons, and a daylight monitor. The user can then apply this profile to a second zone with a dimmer load, even if the second zone does not include the same type of switch.

In an exemplary embodiment, the controller can include an A and B button associate with each relay and one or more LED indicators can be associated with the A and B buttons. To enter the load configuration a user can press and hold down buttons A and B simultaneously, or perform some other initiating operation. When load configuration is initiated, relay #1 turns on and all other relays are turned off. The LED indicator for button A can also turn ON. LED indicator B can indicate if the relay is in occupancy (ON) or vacancy (OFF) mode, and button B can be sued to toggle the mode as needed. Switch station 30 buttons can be sued to assign or un-assign relay 1 to that switch 30, where a switch button indicator LED ON indicates assigned and LED OFF indicates un-assigned. Once a relay is assigned, the user can press one of the buttons to advance to the next relay. Logical relay #2 turns ON and relay #1 turns OFF and relay #2 is configured in the same manner and a user can rotate through all loads in the zone as needed. To exit the configuration, a user can press both buttons A and B simultaneously.

In an exemplary embodiment, while in load configuration mode, a user can press and hold down buttons A and B simultaneously for a set time to enter daylight dimming mode. In daylight dimming configuration all relays in the room turn ON and logical dimmer #1 begins to cycle between 100% and 10%. The indicator LED B indicates if this dimmer will be under control of the photocell. ON=YES and OFF=NO. Button B can be used to toggle the YES/NO mode as needed. A user can press button A to advance to the next dimmer. Dimmer #1 stops cycling and logical dimmer #2 begins cycling. In an exemplary embodiment, up to three dimmers may be included for three photocell dimming zones. The second dimmer will be set with a 20% dimming offset above dimmer one. The third with a 40% offset.

In daylight harvesting calibration mode, all lights in the room cycle between OFF and full ON as needed to accomplish auto calibration. At the completion of auto calibration, the room exits configuration mode and returns to the state it was in when configuration mode was first entered.

Load control can also be established by using the switches 30. In an exemplary embodiment, pressing different buttons on the switches for a certain amount of time may initiate a configuration mode or the switches 30 may be provided with a configuration button. For toggle buttons 32 when the configuration mode is entered, relay 1 turns on and all other relays turn off. The LED(s) on the switches 30 can indicate the assignment of the load to the buttons. A user can touch a button to light the LED and assign the relay to this button or touch a button to extinguish the LED to un-assign a relay from the button. Once the assignment is made, a user can press and release the configuration button to advance to the next relay. Relay 1 turns off and relay 2 turns on and the assignments are made for relay 2 in a similar fashion. For switches 30 with on and off buttons 36, 38, a user can press and release the ON button to assign the switch 30 to the relay or press the OFF button to unassign the switch 30 to the relay. With a raise/lower button 34 a user can enter the dimmer configuration mode and turn on all relays. Dimmer load 1 goes to full bright and all other dimmers go to minimum. A user then presses the raise button to assign a switch to dimmer load 1 or press the lower button to unassign a switch to dimmer load 1. The configuration button can then be pressed to advance to the next dimmer.

Figure 20:
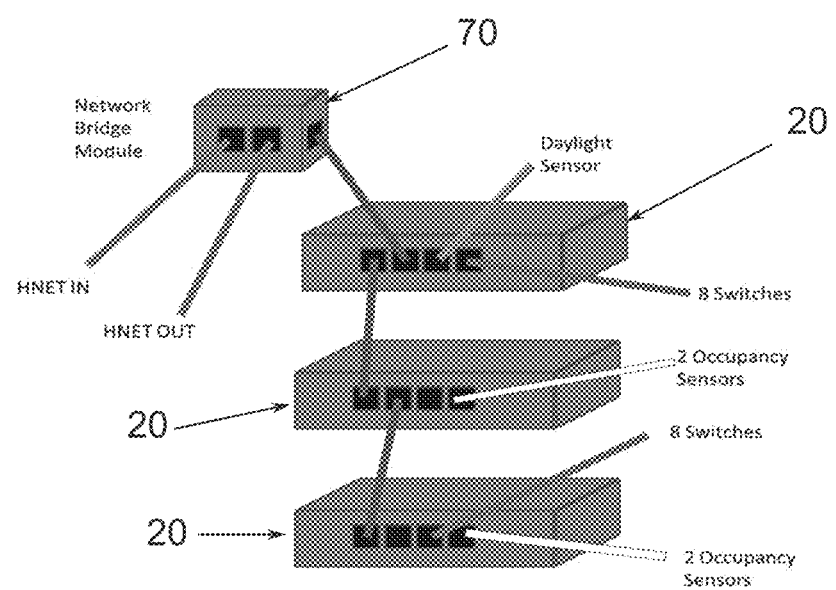
FIG. 20 shows a string of controllers coupled to each other in accordance to some embodiments.
Figure 22:
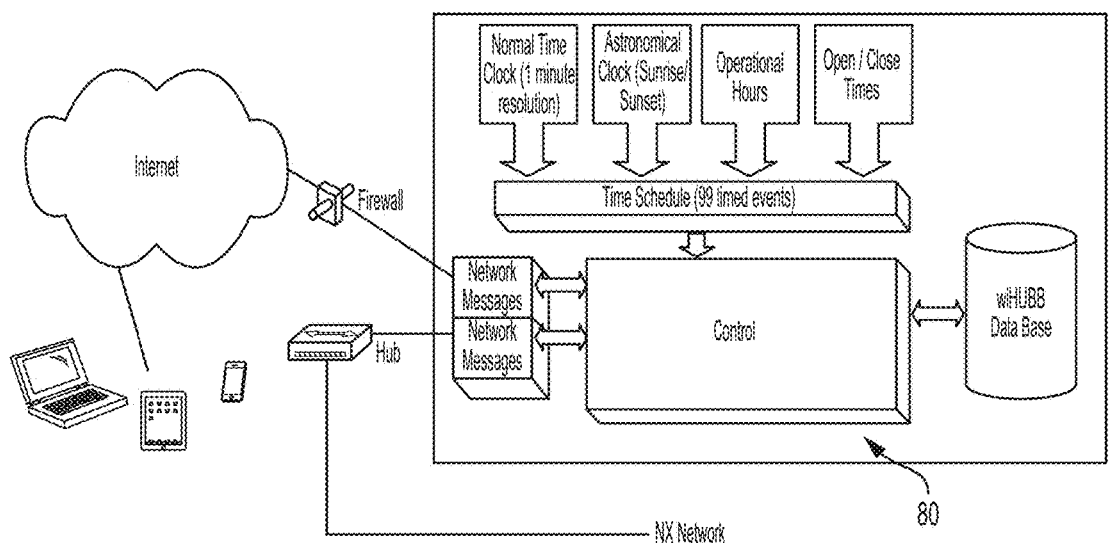
FIG. 22 illustrates a schematic of a facility/area controller in accordance to some embodiments.

The controllers 20 are capable of participating in a networked system. Connectivity to the network can be through a bridge module 70. In an exemplary embodiment depicted in FIG. 20, the bridge module 70 has two RJ45 ports provided and configured to allow IN and OUT connections for the network and one smart port for connection to a controller 20. All controllers 20 and devices that are connected to one bridge module 70 can be associated with the same zone and become discoverable over a network. Multiple zones are controlled and/or monitored by an area controller 80. A schematic example of a facility/area controller 80 is shown in FIG. 22. The act of configuring one or more controllers 20 and devices as a stand-alone system can associate them as a zone for the purpose of discovery by an area controller 80 connected to the network to communicate with the various room level controllers 20. All local load, group, button, and photocell commissioning/programming will be preserved during discovery and become available from the area controller 80 user interface. The area controller 80 can provide an interface for commissioning, control, and monitoring functions. In an exemplary embodiment, the interface is provided through a browser, application, or other computer program. One or more master zone or area switches can be provided, for example connected to an area controller 80, to control entire zones or areas.

Figure 23:
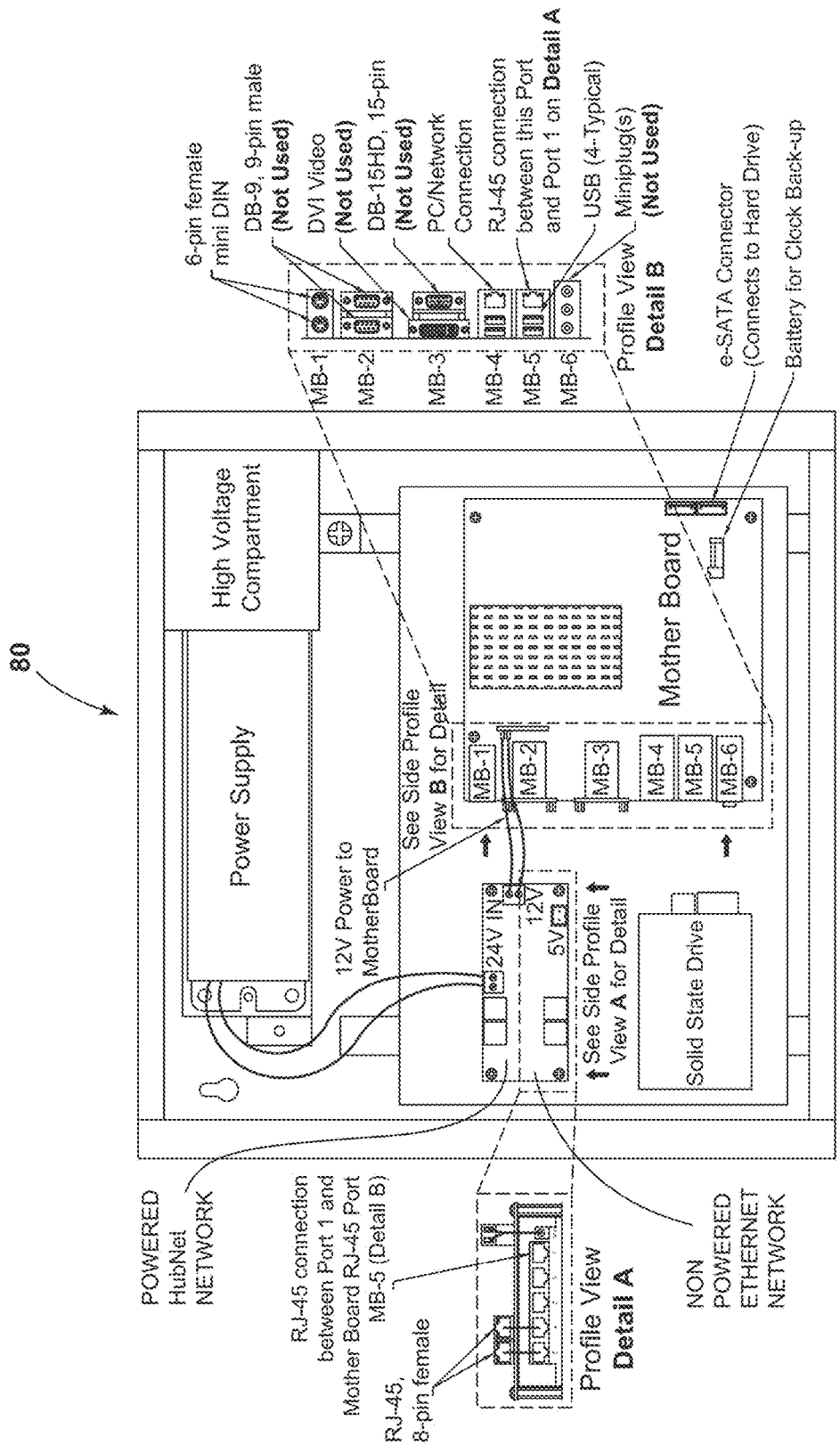
FIG. 23 shows a schematic of an exemplary embodiment of a control panel.
Figure 24:
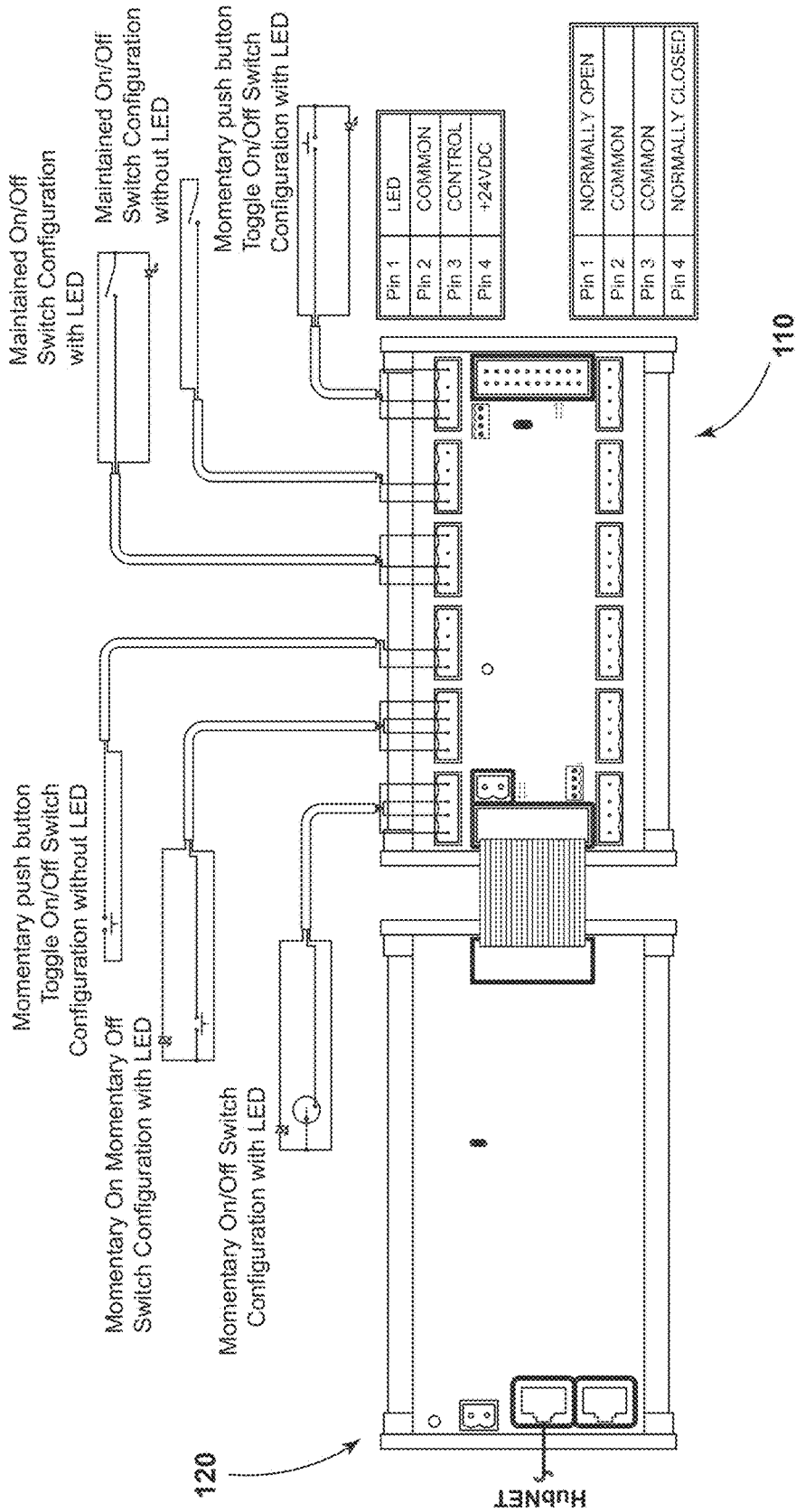
FIG. 24 shows a controller connected to a number of peripherals in accordance to some embodiments.
Figure 25:
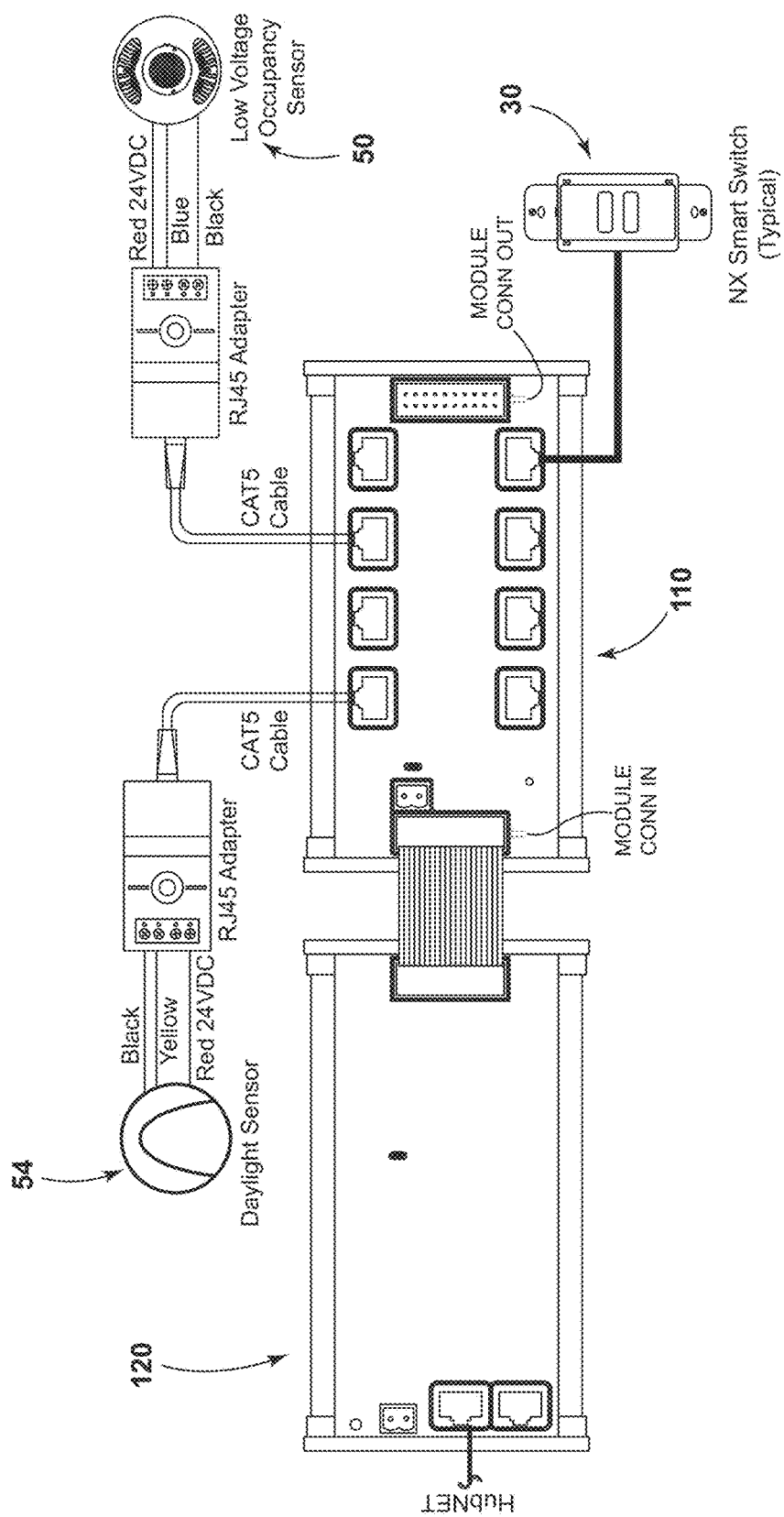
FIG. 25 shows a controller connected to a number of loads in accordance to some embodiments.
Figure 26:
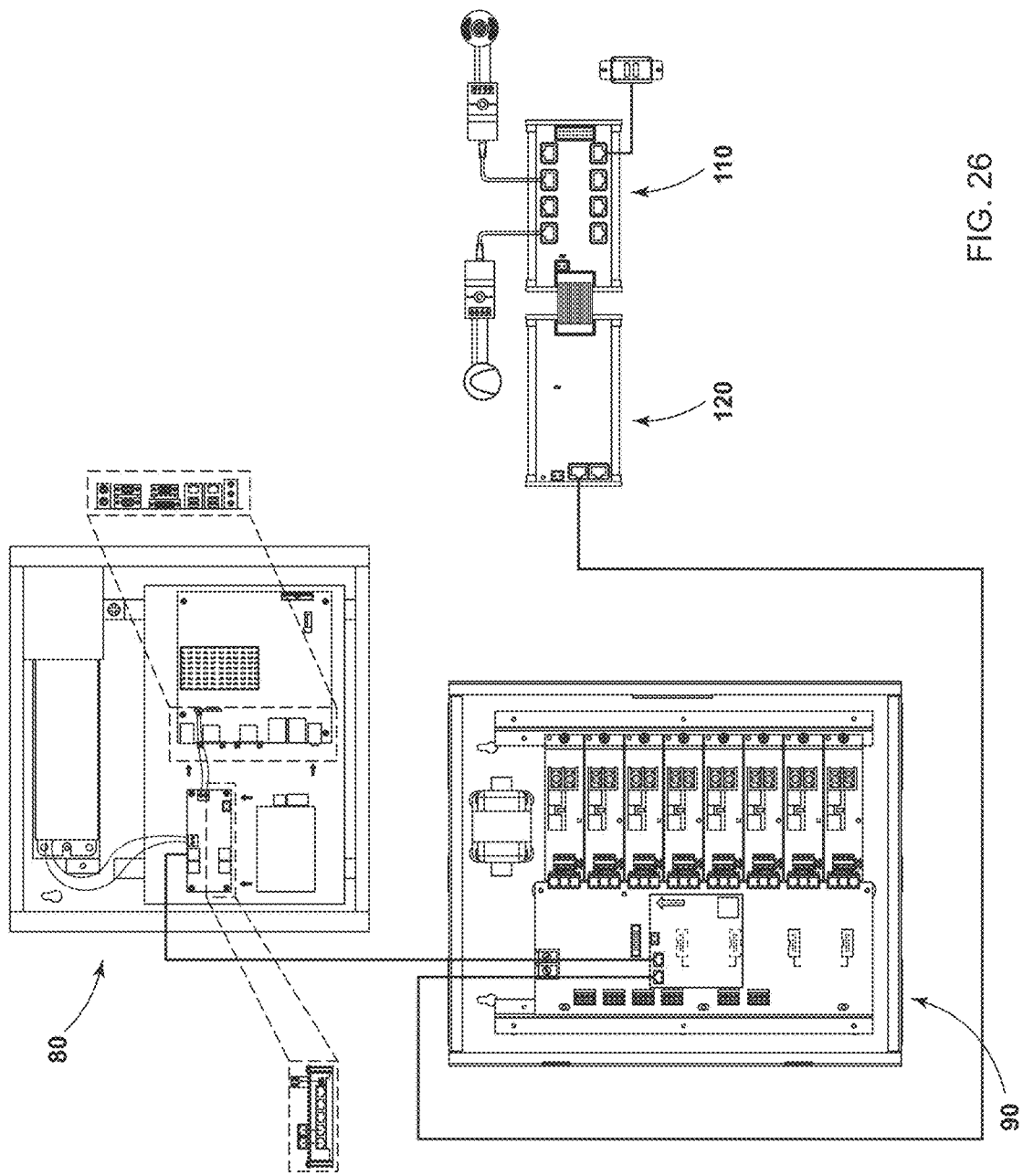
FIG. 26 shows a number of controllers connected to a number of loads in accordance to some embodiments.
Figure 27A:
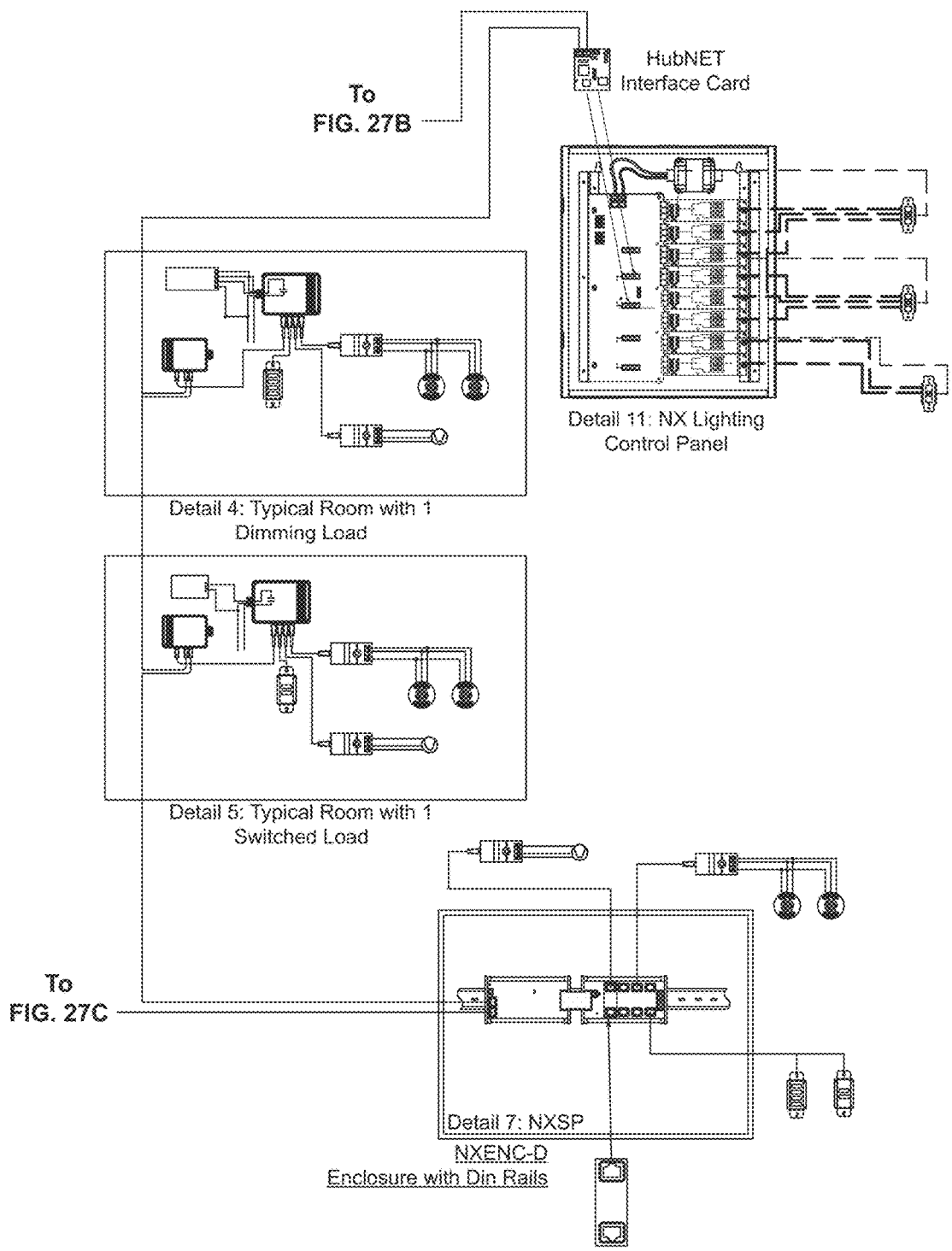
FIGS. 27A-C show a number of controllers networked together to control a plurality of loads in accordance to some embodiments.
Figure 27B:
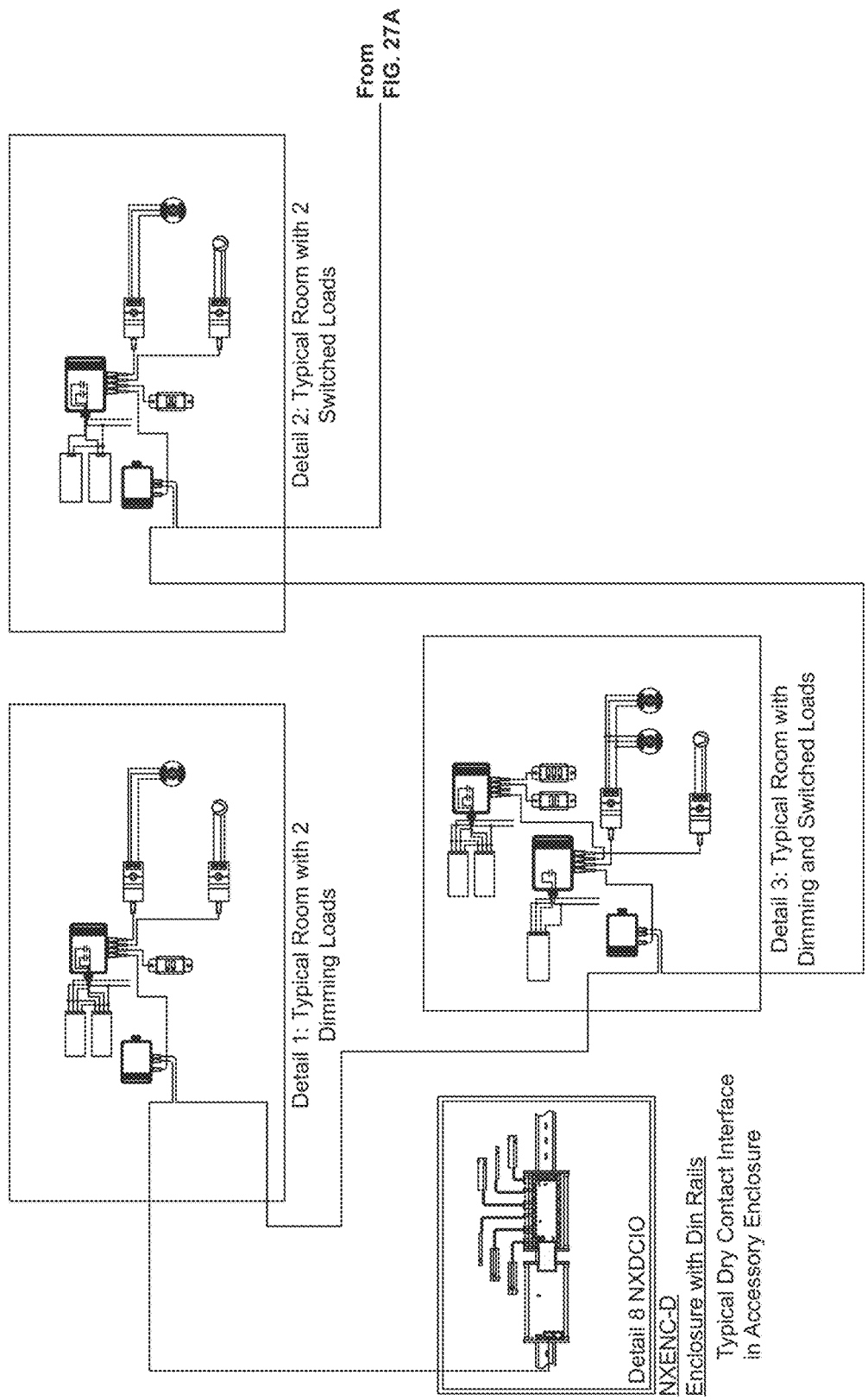
Figure 27C:
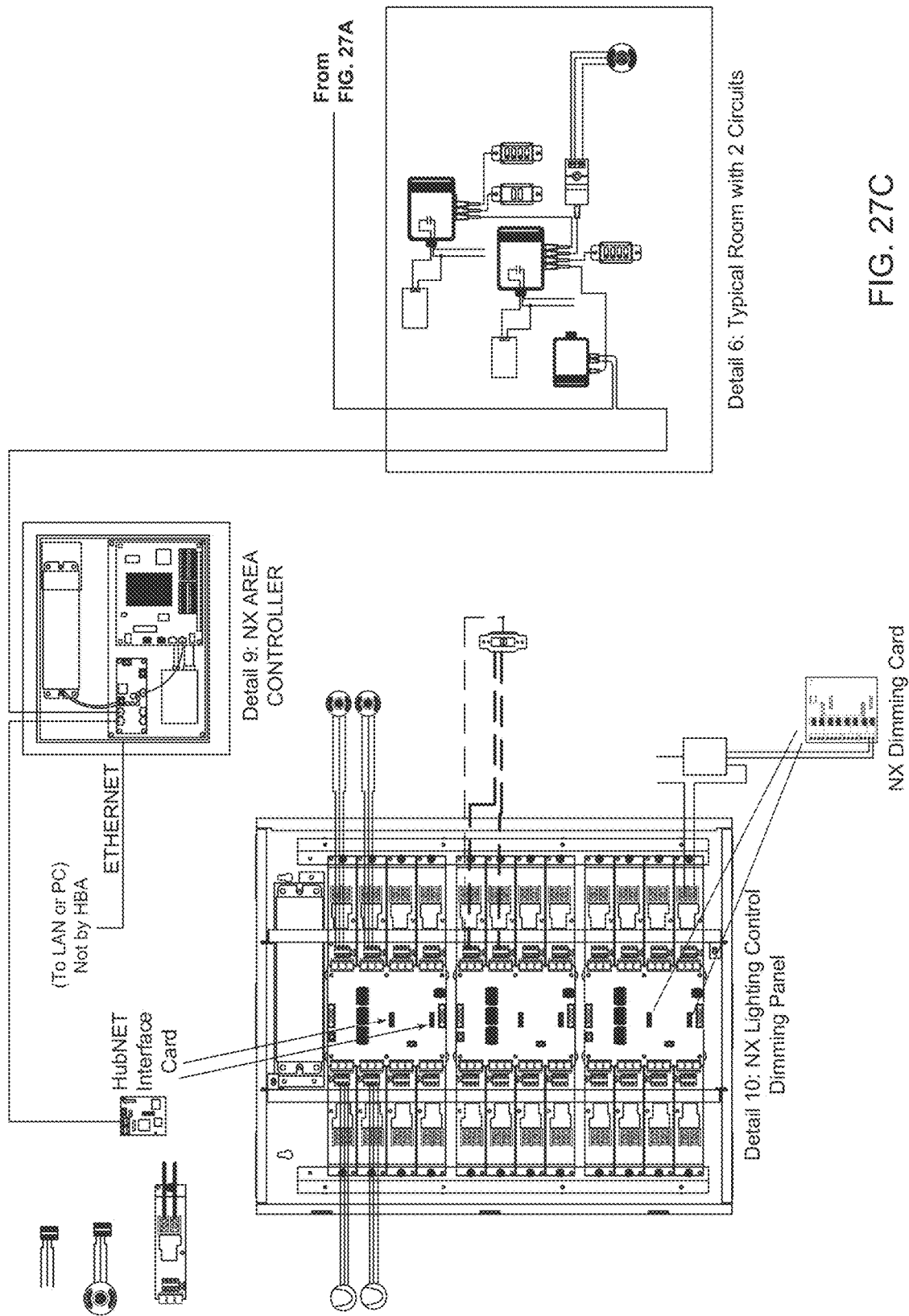
Figure 28:
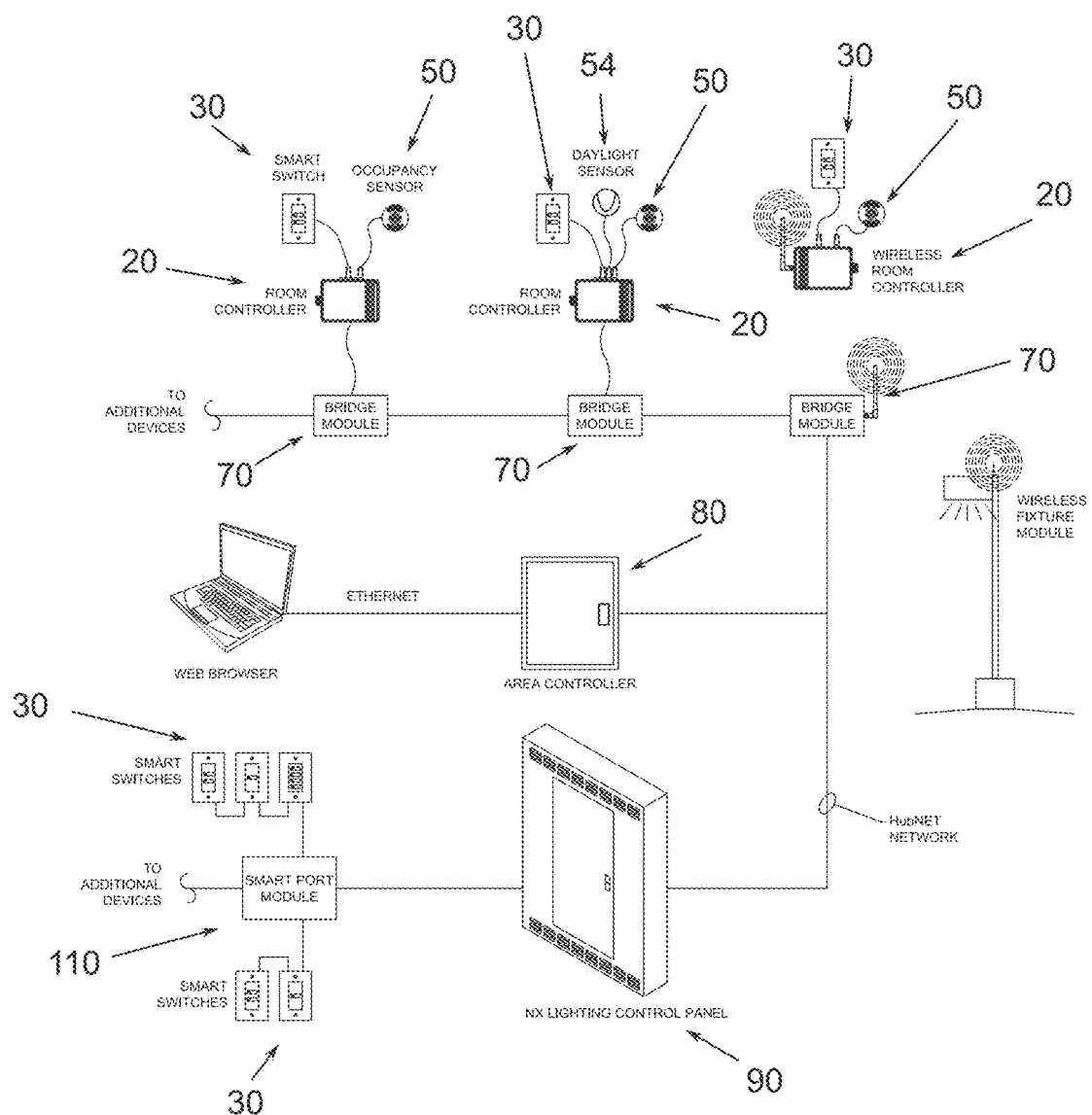
FIG. 28 shows a lighting control panel connected to a number of loads and device in accordance to some embodiments.
Figure 29:
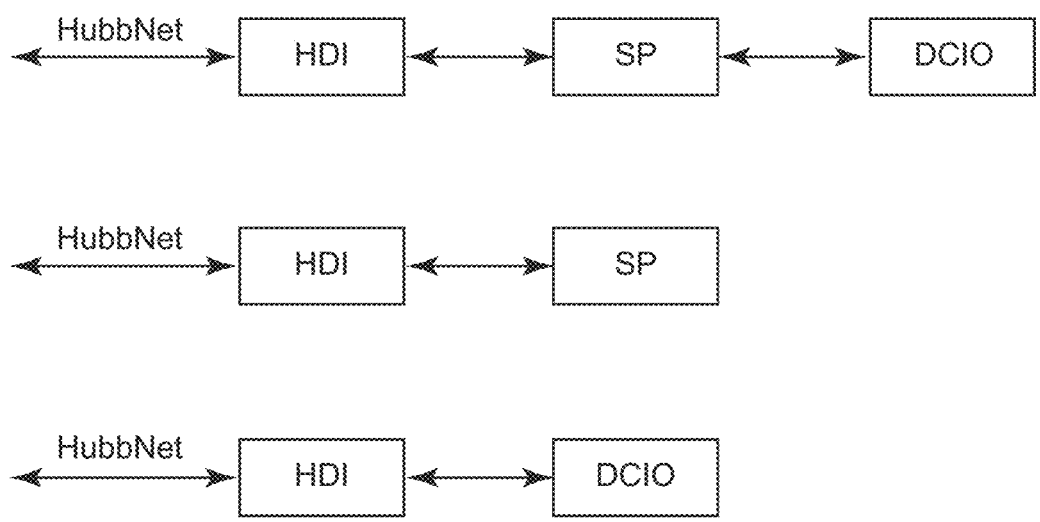
FIG. 29 shows three exemplary embodiments of how modules can be connected.

In various exemplary embodiments, a system can include one or more control panels 90 that control and/or monitor multiple area controllers 80. The control panels 90 can be connected to the network, for example through a bridge module. The control panels 90 can include support devices such as the smart port module to allow the use of smart switches with the panel(s) and dry contact input output module (DCIO) for interface to third party systems. The control panels 90 can also include switches that can be used to control multiple zones or areas. FIG. 23 shows a schematic of an exemplary embodiment of a control panel 90. The control panel 90 can provide all resources required for the processing of all inputs, control of all outputs, schedules and status of all inputs and outputs and can include all of the functional requirements to support the features and functions listed herein.

An exemplary use of the devices and methods described herein can include a school where each classroom has a dual relay controller 20 with dimming loads, an occupancy sensor 50, two switches 30 that include on and off buttons 36, 38 and raise/lower buttons 34, and a daylight sensor 54. These components are configured for both loads vacancy mode (manual on). Daylight harvesting can be set up to control two rows of lighting independently based on available daylight. The dimming is configured so that a teacher can override the daylighting above or below the set point. Daylighting is automatically set back to automatic when the occupancy sensor 50 times out and re-triggers or the lights are manually turned off and back on with the switches 30. Administrative offices can each have a dual relay controller 20, a two toggle button 32 switch station 30, and an occupancy sensor 50. These offices can use the default configuration which powers one load in vacancy mode (manual on) and one in occupancy mode (auto on). A control panel 80 is used to control hallways, common areas, building mounted exterior lighting and exterior canopy lighting. The interior zones are controlled based on a time schedule and the exterior is controlled from both a time schedule and a roof mounted photocell. Parking lot pole lighting is controlled via wireless using sensors on the poles. A smart port module can act as a connection point for several Smart Switches that control the hallways, common areas, building mounted exterior lighting and provide manual override of the pole mounted parking lot lighting. The area controller can be connected to the school's LAN such that the administration can log in from any PC on the LAN. A building automation system interface module connects the lighting system to the building automation system and provides a building automation client network IP gateway for integration. Components of the lighting system, for example the area controller or control panel 90, can also include a building automation client network stack to allow direct IP connectivity without a separate gateway.

Certain exemplary embodiment can utilize panel only systems that use the control panel 90 for relay and dimmer control and an area controller to provide the user interface. Simple applications with only a limited number of switches direct wired to the panel(s). Applications with more demanding requirements, will use the smart port module to allow connection of smart switches 30. A future enhancement to the panel can include the ability to connect smart switches 30 directly to the panel. For example, 1, 2, 3, and 4 button toggle switch stations with LEDs can be connected to a panel. These buttons can be programmable both for load control and button functionality.

The Dry Contact Input/Output 100 and Smart Port modules 110 are used to provide connectivity for various types of inputs and outputs to network-connected devices. In an exemplary embodiment, a proprietary network (HubbNet) is established with an interface based on 10BaseT Ethernet with additional 24 VDC power on the unused CAT 5 conductors. NX Panels 90 and Bridge Modules 70 are two examples of devices with a HubbNet interface. The HubbNet Device Interface board is used to provide the HubbNet interface for modules. Other types of networks can be used.

Various exemplary embodiments the system can include a Dry Contact Input/Output Module 100, a Smart Port Module (SP) 110, and/or a HubbNet Device Interface (HDI) 120.

The DCIO Module 100 is configured to connect and interface dry contact switch inputs and incorporate their functions into a the control system. Dry Contact input devices which may be connected and interfaced to include, but are not limited to, photosensors, motion sensors, legacy switches and contact closure switches. In an exemplary embodiment, six Dry Contact relays are also included on the DCIO 100. These can be used to interface with a variety of devices such as drape and blind control, partition control, pumps and external power packs. The inputs and outputs are also commonly used as a simple interface between systems that are incompatible at the protocol communication level, but can react to On and Off states. HVAC and Building Automation Systems are examples where this type of interface can be used.

In addition to the six input and six output connectors and associated interface circuitry, the DCIO 100 board also includes a microcontroller. The microcontroller takes care of the low-level interface control and timing. It also communicates with the HDI 120 microcontroller to send and receive Communication Protocol messages.

The SP 110 can be used to add Smart Port capabilities to components that have no internal Smart Ports, for example, some embodiments of panels 90 that do not incorporate smart ports. In addition, the module can be used to provide a remote HubbNet connection point for Smart Port peripherals. In an exemplary embodiment, there are four separate Smart Ports, each of which can be individually configured and commissioned their own Area, Zone and Groups. Each Smart Port 110 connector has connections for Smart Port RS-485 Protocol communication, Occupancy Detect input and Photosensor input. Each also can supply 24V power to attached Smart Port peripherals. Each connector can be completely separate so the SP 110 can connect to up to 32 Smart Port switches, four Occupancy Sensors and four Photosensors.

Like the DCIO 100, the SP 110 also includes a microcontroller that takes care of the low-level interface control and timing. It also communicates with an HDI 120 microcontroller to send and receive Communication Protocol messages.

The HDI 120 can be a DIN rail form-factor printed circuit board that controls the SP 110 and DCIO 100. It has two HubbNet RJ45 receptacles, one two-pin power receptacle and a 20-pin IDC header. The two HubbNet connectors provide the daisy-chain connection from one HubbNet device to another. The HDI 120 can be powered by 24V from HubbNet or it can be powered via a separate power supply connected to the power receptacle. If a separate power supply is connected, the power lines from HubbNet are automatically disconnected by opening an on-board relay. This allows the option of not reducing the HubbNet power budget and also the ability to inject power into the HubbNet cable for downstream devices. If no external power supply is connected, the HubbNet power is passed through from one connector to the other.

Functional blocks on-board the HDI 120 can include a microcontroller, an Ethernet MAC/PHY and switch, a Real Time Clock (RTC) with capacitor-based backup power and the serial interface to the SP 110 and DCIO 120. The Ethernet MAC/PHY provides the communication with the 10BaseT Ethernet interface in the HubbNet cable. The Ethernet switch enables HubbNet to daisychain from one device to another, giving the appearance of a common multi-drop bus, even though Ethernet is a point-to-point standard. The RTC acts as a time server for the peripheral modules so they can execute time-based functions such as schedules and active/inactive times. The RTC will keep accurate time for at least 72 hours after external or HubbNet power is removed. The microcontroller passes data between the Ethernet interface and the peripheral modules. It also controls access to the RTC. Communication to the DCIO 100 and SP 110 peripheral modules is through a logic-level serial interface.

Various exemplary embodiments are also directed to a system and method for configuring devices to easily accommodate changes in zones. For example a single large room can be set up into three zones utilizing different controllers, switches, and occupancy sensors. The room can then be separated into two or three individual rooms, for example by the addition of walls or other partitions. When there is one room, all zones should be activated if any of the occupancy sensors detect a presence. In an exemplary embodiment, a partition switch can be provided that has buttons representing the different partitions and/or combinations of zones. The buttons on the switch can be associated with different walls through a control point or can be set up directly at the switch.

A user can go into the individual zones and establish which devices control which loads. The partition switch can then be placed into a configuration mode and a user can enter the zone and activate a switch or other device associated with a partition. For example the user enters a configuration mode for a first partition and then activates a switch in zone two to associate that switch with a first partition and perform the same function to associate a switch or other device with a second partition. A user can then inform the system of the presence of partitions by pressing the associated button on the partition switch. When both partition are present, the loads in the three zones will be activated by the associated occupancy sensor. When only the first partition is present, the loads in zone one are activated by the zone one occupancy sensor and the loads in zones two and three are activated by either the zone two or zone three occupancy sensor. When only the second partition is present, the loads in zones on and two are activated by the occupancy sensor in zone one or zone two. Accordingly, this type of control configuration can be established without an graphical interface or the need for the system to know or understand the physical structure of the room. This type of control configuration can be modified to include any combination of sensors, switches, and loads including dimmable loads, as desired by a user. A user can also establish a base configuration for each room or zone grouping and tell different groups to listen to certain zones.

Another exemplary embodiment includes associating partition switch buttons with the partition by indicating the two zones on either side of the partition. For example, to configure Button A with Partition A which is between Zones 1 and 2 a user can: enter configuration mode, press partition switch button A, press a switch station button in zone 1, then press a switch station button in Zone 2. The partition switch now knows which Zones are next to each other and which partition divides the two Zones. This method is useful when there is no contact closure switch connected directly to the partition so there is no electrical method of identifying the partition.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

As used in this application, the terms "front," "rear," "upper," "lower," "upwardly," "downwardly," and other orientation descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A room lighting system controller comprising:
    a memory;
    a microprocessor configured to access data from the memory and provide commands to assign a plurality of loads to a first group, a second group, or both the first and second groups;
    a relay for powering a load; and
    a port for connecting a peripheral device, wherein the port is configured to send and receive data packets including a device type and a device instance byte, the device instance byte including a port number identifying the port and a slot number identifying a time slot within a time domain multiplexing cycle.

2. A room lighting system comprising:
    a room controller having a microprocessor for accessing data and providing commands, memory for storing information operably connected to the microprocessor, a relay for powering a load based on commands from the microprocessor, and a port for connecting a peripheral device;
    a peripheral device connected to the port and configured to send data including a device type and a device instance byte, the device instance byte including a port number identifying the port and a slot number identifying a time slot within a time domain multiplexing cycle, to the controller indicating the type of peripheral device; and
    a load connected to the relay.

3. The room lighting system of claim 1, wherein the peripheral device is switch.

4. The room lighting system of claim 1, wherein the peripheral device is as sensor.

5. The room lighting system of claim 1, wherein the room controller includes a dimming control.

6. The room lighting system of claim 1, further comprising an area controller.

7. The room lighting system of claim 1, further comprising a control panel.

8. The room lighting system of claim 1, further comprising a network interface.

9. The room lighting system of claim 1, further comprising a bridge module.

10. The room lighting system of claim 1, further comprising a smart port module including a serial port.

11. The room lighting system of claim 7, further comprising a dry contact input output module.

12. A method of controlling a system of electrical loads comprising:
    assigning a plurality of loads to a first group, a second group, or both the first and second groups;
    assigning a first peripheral device to control loads in the first group and assigning a second peripheral device to control loads in the second group;
    sending a command, the command including a device type and a device instant instance byte, the device instance byte including a port number identifying a port of a controller and a slot number identifying a time slot within a time domain multiplexing cycle, to the first group;
    sending a communication to at least one of the first and second peripheral devices indicating a status of the load associated with that peripheral device.

13. The method of claim 12, wherein a load is assigned to the first group and the second group and the status of the load is communicated to both the first and second peripheral devices.

14. A method of controlling a system of electrical loads comprising:
operably connecting a partition switch having a first button and a second button to a controller operably connected to a first load and a first device in a first zone, a second load and a second device in a second zone, and a third load and a third device in a third zone, wherein connecting the partition switch includes connecting the switch to a port of the controller, and wherein the port of the controller is configured to send and receive data packets including a device type and a device instance byte, the device instance byte including a port number identifying the port of the controller and a slot number identifying a time slot within a time domain multiplexing cycle;
configuring the first button by activating the first and second devices; and
configuring the second button by activating the second and third devices, wherein after configuration, the first and second buttons can selectively allow the first, second, and third zones to be controlled independently, the first zone to be controlled with the second zone, the second zone to be controlled with the third zone, and the first, second, and third zones to be controlled together.

* * * * *